US012453861B2

(12) United States Patent
Etzel et al.

(10) Patent No.: US 12,453,861 B2
(45) Date of Patent: Oct. 28, 2025

(54) WEARABLE CARDIOVERTER DEFIBRILLATOR COMPONENT ASSEMBLY VERIFICATION

(71) Applicant: ZOLL Medical Corporation, Chelmsford, MA (US)

(72) Inventors: Brian M Etzel, Butler, PA (US); David C Major, Pittsburgh, PA (US); Richard S Sharbaugh, New Kensington, PA (US)

(73) Assignee: ZOLL Medical Corporation, Chelmsford, MA (US)

( * ) Notice: Subject to any disclaimer, the term of this patent is extended or adjusted under 35 U.S.C. 154(b) by 400 days.

(21) Appl. No.: 17/937,064

(22) Filed: Sep. 30, 2022

(65) Prior Publication Data

US 2024/0108903 A1 Apr. 4, 2024

(51) Int. Cl.
*A61N 1/365* (2006.01)
*A61N 1/02* (2006.01)
(Continued)

(52) U.S. Cl.
CPC ......... *A61N 1/36521* (2013.01); *A61N 1/025* (2013.01); *A61N 1/321* (2013.01); *A61N 1/3704* (2013.01)

(58) Field of Classification Search
None
See application file for complete search history.

(56) References Cited

U.S. PATENT DOCUMENTS 4,928,690 A 5/1990 Heilman et al.
5,042,498 A * 8/1991 Dukes .................. A61B 5/6843
600/509
(Continued)

OTHER PUBLICATIONS

Dejan, "Arduino Color Sensing Tutorial—TCS230 TCS3200 Color Sensor", Arduino Tutorials, 7 pages, 2016, https://howtomechatronics.com/tutorials/arduino/arduino-color-sensing-tutorial-tcs230-tcs3200-color-sensor.
(Continued)

*Primary Examiner* — Mallika D Fairchild
(74) *Attorney, Agent, or Firm* — ZOLL Medical Corporation

(57) ABSTRACT

A wearable cardiac device for providing feedback during device assembly includes a garment configured to be continuously worn and an electrode belt including a plurality of assemblable elements. Each of the assemblable elements is configured for assembly into the garment prior to use of the wearable cardiac device. The plurality of assemblable elements includes electrodes configured to facilitate sensing electrical signals associated with cardiac activity of and/or deliver one or more therapeutic pulses to a patient. At least one of the plurality of assemblable elements includes respective local assembly feedback circuitry. Each respective local assembly feedback circuitry includes an assembly verification sensor configured to sense whether the respective assemblable element is correctly assembled into the garment and local assembly feedback indicator(s) locally disposed on the respective assemblable element and configured to provide a human-discernable feedback alert indicating whether the respective assemblable element is correctly assembled into the garment.

21 Claims, 20 Drawing Sheets

(51) Int. Cl.
*A61N 1/32* (2006.01)
*A61N 1/37* (2006.01)

(56) References Cited

U.S. PATENT DOCUMENTS

| | | | |
|---|---|---|---|
| 5,944,669 A | 8/1999 | Kaib | |
| 6,253,099 B1 | 6/2001 | Oskin et al. | |
| 7,974,689 B2 | 7/2011 | Volpe et al. | |
| 8,369,944 B2 | 2/2013 | Macho et al. | |
| 9,737,262 B2 | 8/2017 | Donnelly et al. | |
| 9,782,578 B2 | 10/2017 | Kaib et al. | |
| 9,814,894 B2 | 11/2017 | Kaib et al. | |
| 9,955,938 B2 | 5/2018 | Kaib | |
| 10,155,118 B2 | 12/2018 | Kaib et al. | |
| 10,269,452 B2 | 4/2019 | Volpe | |
| 10,729,910 B2 | 8/2020 | Kaib et al. | |
| 2003/0004547 A1 | 1/2003 | Owen et al. | |
| 2003/0083584 A1* | 5/2003 | Yonce | A61B 5/28 600/509 |
| 2014/0275857 A1* | 9/2014 | Toth | A61M 16/085 600/301 |
| 2015/0035654 A1* | 2/2015 | Kaib | H01M 10/48 340/10.51 |
| 2015/0039042 A1 | 2/2015 | Amsler et al. | |
| 2016/0267765 A1* | 9/2016 | Kaib | G08B 21/18 |
| 2017/0056682 A1* | 3/2017 | Kumar | A61N 1/3975 |
| 2017/0182330 A1* | 6/2017 | Schneider | G16Z 99/00 |
| 2018/0000405 A1* | 1/2018 | Penders | A61B 8/4416 |
| 2018/0168508 A1* | 6/2018 | Biel | A61B 5/282 |
| 2018/0243549 A1 | 8/2018 | Hill et al. | |
| 2022/0008715 A1 | 1/2022 | Freeman et al. | |

OTHER PUBLICATIONS

"TN1216 Technical Note—ST25 NFC Guide", STMicroelectronics, Oct. 2016, 38 pages.

\* cited by examiner

WEARABLE CARDIOVERTER DEFIBRILLATOR COMPONENT ASSEMBLY VERIFICATION

BACKGROUND

The present disclosure relates to a wearable cardiac treatment system configured to treat cardiac arrhythmias occurring in ambulatory and/or in-hospital patients.

Heart failure, if left untreated, can lead to certain life-threatening arrhythmias. Both atrial and ventricular arrhythmias are common in patients with heart failure. One of the deadliest cardiac arrhythmias is ventricular fibrillation, which occurs when normal, regular electrical impulses are replaced by irregular and rapid impulses, causing the heart muscle to stop normal contractions. Because the victim has no perceptible warning of the impending fibrillation, death often occurs before the necessary medical assistance can arrive. Other cardiac arrhythmias can include excessively slow heart rates known as bradycardia or excessively fast heart rates known as tachycardia. Cardiac arrest can occur when a patient in which various arrhythmias of the heart, such as ventricular fibrillation, ventricular tachycardia, pulseless electrical activity (PEA), and/or asystole (heart stops all electrical activity), result in the heart providing insufficient levels of blood flow to the brain and other vital organs for the support of life. It is generally useful to monitor heart failure patients to assess heart failure symptoms early and provide interventional therapies as soon as possible.

Patients may be prescribed to wear cardiac treatment devices for extended periods of time. Cardiac treatment devices may provide defibrillation shocks to the patient if an abnormal cardiac rhythm is detected. The abnormal cardiac rhythm is detected using electrocardiogram (ECG) electrodes, and the defibrillation shocks are provided using therapy electrodes.

SUMMARY

In one or more examples, a wearable cardiac device for providing feedback during device assembly is provided. The wearable cardiac device includes a garment configured to be continuously worn about a torso of a patient for an extended period of time and an electrode belt including a plurality of assemblable elements. Each of the assemblable elements is configured for assembly into the garment prior to use of the wearable cardiac device by the patient. The plurality of assemblable elements includes a plurality of electrodes configured to facilitate sensing electrical signals associated with cardiac activity of the patient and/or deliver one or more therapeutic pulses to the patient. At least one of the plurality of assemblable elements includes respective local assembly feedback circuitry. Each respective local assembly feedback circuitry includes an assembly verification sensor configured to sense whether the respective assemblable element is correctly assembled into the garment and one or more local assembly feedback indicators locally disposed on the respective assemblable element and configured to provide a human-discernable feedback alert indicating whether the respective assemblable element is correctly assembled into the garment.

Implementations of the wearable cardiac device for providing feedback during device assembly can include one or more of the following features. The local assembly feedback indicators include one or more visual indicators. The one or more visual indicators include one or more LEDs configured to light up to provide the human-discernable feedback alert indicating whether the respective assemblable element is correctly assembled into the garment. The one or more visual indicators include one or more colored indicators configured to light up to provide the human-discernable feedback alert indicating whether the respective assemblable element is correctly assembled into the garment. The one or more visual indicators include a first colored indicator configured to light up when the respective assemblable element is correctly assembled into the garment and a second colored indicator configured to light up when the respective assemblable element is incorrectly assembled into the garment. The one or more local assembly feedback indicators include one or more auditory indicators. The one or more auditory indicators include a speaker configured to emit a sound to provide the human-discernable feedback alert indicating whether the respective assemblable element is correctly assembled into the garment. The one or more local assembly feedback indicators include one or more tactile indicators. The one or more tactile indicators include a buzzer configured to vibrate to provide the human-discernable feedback alert indicating whether the respective assemblable element is correctly assembled into the garment.

The assembly verification sensor includes a radio frequency identification (RFID) reader configured to sense an RFID tag disposed on the garment. The assembly verification sensor includes a near field communication (NFC) reader configured to sense an NFC tag disposed on the garment. The assembly verification sensor includes a photoelectric sensor configured to sense a color tag disposed on the garment. The assembly verification sensor includes a Hall effect sensor configured to sense a magnet disposed on the garment.

The plurality of electrodes includes at least one therapeutic electrode configured to deliver the one or more therapeutic pulses to the patient. The at least one of the plurality of assemblable elements including the respective local assembly feedback circuitry includes the at least one therapeutic electrode. The plurality of electrodes includes at least one sensing electrode configured to sense the electrical signals associated with the cardiac activity of the patient. The at least one of the plurality of assemblable elements including the respective local assembly feedback circuitry includes the at least one sensing electrode.

The wearable cardiac device further includes a controller configured to generate an ECG signal based on the electrical signals and determine whether the patient is experiencing a treatable cardiac arrhythmia using the ECG signal. The plurality of electrodes further include at least one therapeutic electrode configured to deliver the one or more therapeutic pulses to the patient. The controller is further configured to generate the one or more therapeutic pulses for delivery to the patient after determining that the patient is experiencing a treatable cardiac arrhythmia. The plurality of assemblable elements further includes a signal processing unit configured to electrically connect at least one of the plurality of electrodes to the controller. The at least one of the plurality of assemblable elements including local assembly feedback circuitry includes the signal processing unit.

The plurality of assemblable elements further includes a response button unit including at least one response button configured to be pushed by the patient to indicate that the patient is conscious. The wearable cardiac device is configured to determine whether the patient is experiencing a treatable cardiac arrhythmia and issue an alert instructing the patient to push the at least one response button upon determining that the patient is experiencing a treatable cardiac arrhythmia. The at least one of the plurality of assemblable elements including respective local assembly feedback circuitry includes the response button unit.

In one or more examples, a wearable cardiac device for providing feedback during device assembly is provided, according to another implementation. The wearable cardiac device includes a garment configured to be continuously worn about a torso of a patient for an extended period of time and an electrode belt including a plurality of assemblable elements. Each of the assemblable elements configured for assembly into the garment prior to use of the wearable cardiac device by the patient. The plurality of assemblable elements includes a plurality of electrodes configured to facilitate sensing electrical signals associated with cardiac activity of the patient and/or deliver one or more therapeutic pulses to the patient. At least one of the plurality of assemblable elements includes respective local assembly feedback circuitry. Each respective local assembly feedback circuitry includes one or more local assembly feedback indicators locally disposed on the respective assemblable element and configured to provide a human-discernable feedback alert indicating whether the respective assemblable element is correctly assembled into the garment.

Implementations of the wearable cardiac device for providing feedback during device assembly can include one or more of the following features, alone or in combinations with one or more of the features discussed above. The one or more local assembly feedback indicators include one or more visual indicators. The one or more local assembly feedback indicators include one or more auditory indicators. The one or more local assembly feedback indicators include one or more tactile indicators. Each respective local assembly feedback circuitry further includes an assembly verification sensor configured to sense whether the respective assemblable element is correctly assembled into the garment. The assembly verification sensor includes a radio frequency identification (RFID) reader configured to sense an RFID tag disposed on the garment. The assembly verification sensor includes a near field communication (NFC) reader configured to sense an NFC tag disposed on the garment. The assembly verification sensor includes a photoelectric sensor configured to sense a color tag disposed on the garment. The assembly verification sensor includes a Hall effect sensor configured to sense a magnet disposed on the garment.

In one or more examples, a wearable cardiac device for providing feedback during device wear is provided. The wearable cardiac device includes a garment configured to be continuously worn about a torso of a patient for an extended period of time and a plurality of electrodes configured to be disposed in the garment. The plurality of electrodes are configured to facilitate sensing electrical signals associated with cardiac activity of the patient and/or deliver one or more therapeutic pulses to the patient. At least one of the plurality of electrodes includes respective local position feedback circuitry. Each respective local position feedback circuitry includes a position verification sensor configured to sense whether the respective electrode is in a predetermined position while the patient is wearing the wearable cardiac device and one or more local position feedback indicators locally disposed on the respective electrode and configured to provide a human-discernable feedback alert indicating whether the respective electrode is incorrectly positioned.

Implementations of the wearable cardiac device for providing feedback during device wear can include one or more of the following features, alone or in combinations with one or more of the features discussed above. The one or more local position feedback indicators include one or more auditory indicators. The one or more auditory indicators include a speaker configured to emit a sound to provide the human-discernable feedback alert indicating whether the respective electrode is incorrectly positioned. The one or more local position feedback indicators include one or more tactile indicators. The one or more tactile indicators include a buzzer configured to vibrate to provide the human-discernable feedback alert indicating whether the respective electrode is incorrectly positioned.

The predetermined position includes a predetermined orientation. The position verification sensor includes an accelerometer configured to output an accelerometer signal indicative of an orientation of the respective electrode. The respective local position feedback circuitry is configured to use the accelerometer signal to determine whether the respective electrode is in the predetermined orientation.

The plurality of electrodes include at least one sensing electrode configured to sense the electrical signals associated with the cardiac activity of the patient and at least one therapeutic electrode configured to deliver the one or more therapeutic pulses to the patient. The at least one sensing electrode is permanently disposed in the garment. The at least one sensing electrode is configured to be assembled into the garment prior to use of the wearable cardiac device by the patient. The at least one therapeutic electrode is configured to be assembled into the garment prior to use of the wearable cardiac device by the patient.

In one or more examples, a wearable cardiac device for providing feedback during assembly is provided. The wearable cardiac device includes a garment configured to be continuously worn about a torso of a patient for an extended period of time and an electrode belt including a plurality of assemblable elements. Each of the assemblable elements is configured for assembly into the garment prior to use of the wearable cardiac device by the patient. The plurality of assemblable elements includes a plurality of electrodes. The plurality of electrodes includes at least one sensing electrode configured to sense electrical signals associated with cardiac activity of the patient and at least one therapeutic electrode configured to deliver one or more therapeutic pulses to the patient. At least one of the plurality of electrodes includes respective local assembly feedback circuitry. Each respective local assembly feedback circuitry includes an assembly verification sensor configured to sense whether the respective electrode is correctly assembled into the garment and one or more local assembly feedback indicators disposed on the respective electrode and configured to provide a human-discernable feedback alert indicating whether the respective electrode is correctly assembled into the garment. The wearable cardiac device also includes a controller configured to generate an ECG signal based on the electrical signals sensed via at least one sensing electrode, determine whether the patient is experiencing a treatable cardiac arrhythmia using the ECG signal, and generate the one or more therapeutic pulses for delivery to the patient via the at least one therapeutic electrode after determining that the patient is experiencing a treatable cardiac arrhythmia.

Implementations of the wearable cardiac device for providing feedback during device wear can include one or more of the following features, alone or in combinations with one or more of the features discussed above. The one or more local assembly feedback indicators include one or more visual indicators. The one or more visual indicators include one or more LEDs configured to light up to provide the human-discernable feedback alert indicating that the respective electrode is correctly assembled into the garment. The one or more visual indicators include one or more colored indicators configured to light up to provide the human-discernable feedback alert indicating that the respective electrode is correctly assembled into the garment. The one or more visual indicators include a first colored indicator configured to light up when the respective electrode is correctly assembled into the garment and a second colored indicator configured to light up when the respective electrode is incorrectly assembled into the garment. The one or more local assembly feedback indicators include one or more auditory indicators. The one or more auditory indicators include a speaker configured to emit a sound to provide the human-discernable feedback alert indicating that the respective electrode is correctly assembled into the garment. The one or more local assembly feedback indicators include one or more tactile indicators. The one or more tactile indicators include a buzzer configured to vibrate to provide the human-discernable feedback alert indicating that the respective electrode is correctly assembled into the garment.

The assembly verification sensor includes a radio frequency identification (RFID) reader configured to sense an RFID tag disposed on the garment. The assembly verification sensor includes a near field communication (NFC) reader configured to sense an NFC tag disposed on the garment. The assembly verification sensor includes a photoelectric sensor configured to sense a color tag disposed on the garment. The assembly verification sensor includes a Hall effect sensor configured to sense a magnet disposed on the garment.

The plurality of assemblable elements further includes a signal processing unit configured to electrically connect at least one of the plurality of electrodes to the controller. The signal processing unit includes additional respective local feedback assembly circuitry. The plurality of assemblable elements further includes a response button unit including at least one response button configured to be pushed by the patient to indicate that the patient is conscious. The controller is configured to issue an alert instructing the patient to push the at least one response button upon determining that the patient is experiencing a treatable cardiac arrhythmia and generate the one or more therapeutic pulses for delivery to the patient upon determining that the at least one response button has not been pushed within a predetermined amount of time. The response button unit includes additional respective local assembly feedback circuitry.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended to limit the scope of the disclosure. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

Figure 1:
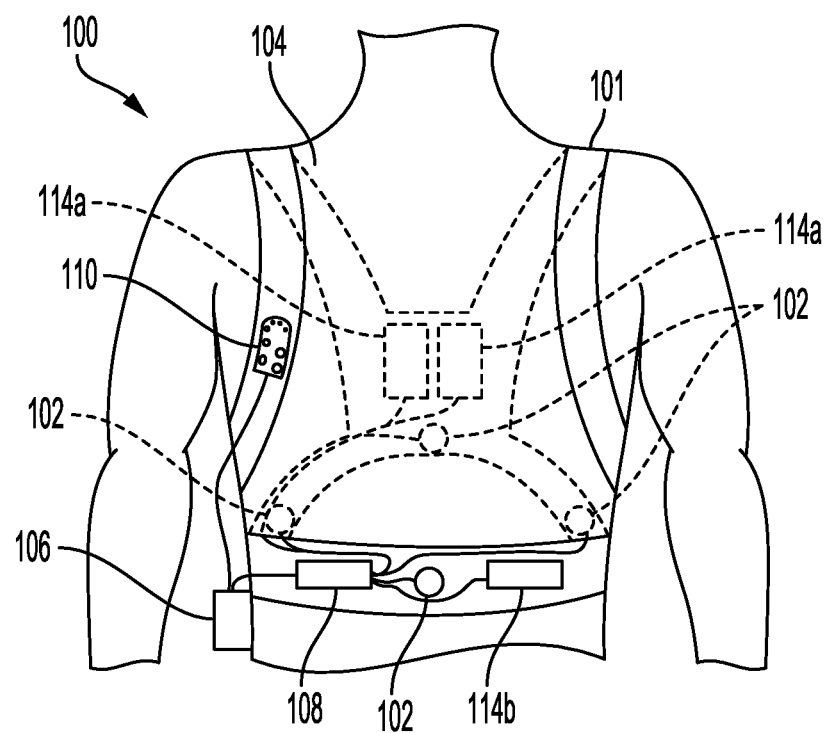
FIG. 1 depicts an example wearable cardiac device.

Wearable cardiac devices implementing the devices, systems, methods, and techniques disclosed herein, such as wearable cardiac treatment devices, can be used in clinical care settings to monitor for treatable cardiac arrhythmias and provide treatments such as defibrillation, cardioversion, or pacing shocks in the event of life-threatening arrhythmias. Thus, while the patient is wearing the wearable cardiac device, the device is configured to detect and treat these life-threatening arrhythmias. The wearable cardiac device may also provide alarms to the patient, warning the patient of an impending shock that the patient may be able to delay or cancel by pressing one or more response buttons thereby indicating that the patient is still conscious. In various implementations, before the patient can wear the wearable cardiac device, the wearable cardiac device may need to be assembled. For example, a wearable cardiac device may include a wearable garment (see, e.g., FIG. 2, described in further detail below) and an electrode belt (see, e.g., FIG. 3, described in further detail below) that includes various components or elements configured to be removably inserted into and/or attached to the garment. These assemblable components or elements may include, for instance, sensing electrodes used to determine whether the patient is experiencing an arrhythmia; therapy electrodes configured to deliver therapeutic shocks; units or boxes configured for signal processing, controlling therapy shocks, etc.; response button units; and/or the like.

As noted in more detail below, the wearable cardiac device implementing the devices, systems, methods, and techniques disclosed herein can facilitate proper assembly of the electrode belt into the garment, thereby enabling the device to function optimally for its primary intended purpose. As discussed above, the primary intended purpose is to deliver one or more therapeutic shocks responsive to determining if the patient is experiencing a life-threatening arrhythmia. For example, if a patient or other user assembling the wearable cardiac device (e.g., a caregiver such as a family member) does not put the sensing electrodes in the right locations on the garment, the device, systems, methods, and techniques disclosed herein will help the patient or other user to locate and address the problem. This way, the wearable device is able to generate the appropriate electrocardiogram (ECG) signals for the patient. The device may thus be able to identify whether the patient is experiencing a life-threatening cardiac arrhythmia while being worn by the patient. As another example, the devices, systems, methods, and techniques disclosed herein will assist the patient or other user by helping guide proper placement of the components into the garment. Thus, the components may not shift or fall off during wear.

As such, this disclosure relates to a wearable cardiac device for providing feedback during device assembly. The wearable cardiac device includes a garment configured to be continuously worn by the patient for an extended period of time and an electrode belt including a number of assemblable elements configured for assembly into the garment prior to use of the wearable cardiac device. At least one of the assemblable elements includes local circuitry incorporated as part of the assemblable element (e.g., contained at least partially within the housing of the assemblable element). The circuitry (e.g., local assembly feedback circuitry) is configured to determine whether the respective assemblable element is correctly assembled into the garment and provide a human-discernable feedback alert indicating whether the respective assemblable element is correctly assembled into the garment. This local assembly feedback circuitry may include, for example, various sensors for identifying correct and/or incorrect assembly, as well as various visual, auditory, and/or tactile indicators for providing the human-discernable feedback alerts. Examples of sensors and indicators are described in further detail below.

In implementations, the same or similar circuitry may also be used to determine whether the assemblable component remains in a correct, predetermined position during wear. If an assemblable component has shifted or become displaced during wear, such as by parts of the garment moving or flipping, the circuitry may alert the patient that the assemblable component is incorrectly positioned. For example, the circuitry may determine whether the assemblable component is incorrectly positioned within the garment and/or with respect to the patient's anatomy and alert the patient accordingly.

In one example use case, a clinician or other caregiver prescribes that a patient at risk of heart failure wear a wearable cardiac device for a certain amount of time (e.g., until the patient is scheduled for a surgery to receive an implantable cardiac defibrillator, until the patient shows a certain amount of improvement in cardiac heath indicators, etc.). The patient may be provided with instructions and/or a demonstration for assembling the electrode belt of the wearable cardiac device into the garment of the wearable cardiac device, such as through a technician, instructional pamphlets, instructional videos, etc. However, to ensure that certain assemblable elements such as the electrodes of the wearable cardiac device (e.g., sensing electrodes and/or therapy electrodes) are assembled properly when the patient is assembling the wearable cardiac device on their own, each electrode may include a assembly verification sensor configured to determine whether the electrode has been inserted or placed into the correct receptacle of the garment. For example, the garment may include pockets (e.g., for the therapy electrodes) and fasteners (e.g., for the sensing electrodes) to removably receive the electrodes of the electrode belt.

If the local assembly verification sensor of an electrode determines that the electrode has been placed into the wrong receptacle, one or more local assembly feedback indicators locally disposed (e.g., one or more light-emitting diodes (LEDs), one or more speakers, one or more tactile buzzers, etc.) on the electrode may light up red to indicate that the electrode is in the wrong location. If the patient 104 does not fix the electrode placement or location after a certain amount of time (e.g., 10 seconds, 15 seconds, 20 seconds, etc.), the electrode may also provide an audible alert such as verbal instructions to the patient via a speaker on the electrode for fixing the positioning of the electrode. For instance, the local assembly feedback circuitry of the electrode may determine that the electrode has been placed onto a fastener one to the right of its correct fastener location on the garment. Thus, the one or more local assembly feedback indicators locally disposed on the electrode (e.g., including a speaker) may instruct the patient to remove the electrode and place it to the fastener on the right. Once the electrode has been placed onto the correct fastener, the one or more local assembly feedback indicators locally disposed on the electrode (e.g., including a green LED) can flash green to indicate the correct placement.

As another illustration, if the assembly verification sensor of an electrode determines that the electrode has been placed into the wrong receptacle, one or more local assembly feedback indicators locally disposed on the electrode (e.g., one or more LEDs or other lights) may light up. If instead the electrode is placed into the correct receptacle, the local assembly feedback indicator light(s) may turn off, and a speaker of the electrode (e.g., implemented as another local assembly feedback indicator) may play a chime to indicate that the assembly is correct.

As another illustration, the local assembly feedback circuitry of an electrode may be configured to determine when the patient is in the process of assembling the electrode belt into the garment. For example, the local assembly feedback circuitry may make this determination based on the patient plugging the electrode belt into a controller of the wearable cardiac device but an assembly verification sensor of the local assembly feedback circuitry detecting that the electrode has not yet been inserted into a receptacle. While the patient is assembling the electrode into the garment, one or more local assembly feedback indicators, e.g., an LED, on the electrode may blink on and off. If the electrode is inserted into the incorrect receptacle, a vibration motor locally disposed on the electrode (e.g., with the vibration motor implemented as another local assembly feedback indicator) may be configured to vibrate repeatedly until the patient removes the electrode from the incorrect receptacle. On the other hand, if the electrode is inserted into the correct receptacle, the LED indicator on the electrode may turn off.

In another example use case, a wearable cardiac device prescribed to a patient includes an electrode belt with electrodes (e.g., sensing electrodes and/or therapy electrodes), a signal processing unit (e.g., signal processing unit 108 of FIG. 1 or signal processing unit 310 of FIG. 3), and a response button unit that need to be assembled into the garment. For example, the electrodes may need to be inserted into or attached to receptacles, the signal processing unit may need to be inserted into a housing and/or folded into a pocket, and the response button unit may need to be snapped onto a strap of the garment. Each of the electrodes, signal processing unit, and response button unit may include local assembly feedback circuitry to determine if and when the respective electrode, signal processing unit, or response button unit is correctly assembled into the garment and indicate when it has not. For instance, each of the electrodes, signal processing unit, and response button unit may include one or more local assembly feedback indicators, e.g., a red LED configured to light up when assembled incorrectly and a green LED configured to light up when assembled correctly.

In another example use case, a wearable cardiac device may include a band configured to encircle the torso of a patient prescribed to wear the wearable cardiac device. The band may include assemblable elements such as sensing electrodes removably insertable into the garment of the wearable cardiac device. While wearing the wearable cardiac device, the band may become flipped over such that one or more of the sensing electrodes are no longer contacting the skin of the patient. A position verification sensor of local position feedback circuitry within each of the sensing electrodes now in the incorrect position may determine that its respective electrode is flipped upside down and activate, as feedback to the patient, a local position feedback indicator in the electrode. For instance, the local position feedback indicator may be a tactile device (e.g., a vibration motor and a sensor for activating the motor) in the electrode. The tactile device vibrates to alert the patient to fix the positioning of the sensor. Once the patient adjusts the band of the garment such that the respective sensing electrode is once again contacting the skin of the patient, the tactile device turns off.

The wearable cardiac devices described herein may provide several advantages over prior art systems. Providing local circuitry (e.g., local assembly feedback circuitry) on assemblable components or elements of an electrode belt to alert a patient or other user assembling the electrode belt into the garment of a wearable cardiac device may work to ensure correct assembly of the wearable cardiac device. The local assembly feedback indicators may help clarify to the patient or other user assembling the wearable cardiac device how the assembly process works by providing immediate or nearly immediate assembly feedback. For example, in implementations, the sensors for verifying correct assembly may be powered independently from a central controller of the wearable cardiac device. As such, the assemblable components or elements may provide feedback to the patient or other user assembling the wearable cardiac device before the electrode belt is connected to the controller, for example, as each assemblable element is inserted into the garment, snapped into the garment, attached to the garment, and/or the like.

Additionally, when a patient or other user assembling the wearable cardiac device has made an assembly mistake, the local assembly feedback indicators on the incorrectly assembled component or element may make it easy for the patient or other user to identify the mistake. In some instances, the local assembly feedback indicators may even provide the patient or other user with instructions for correcting the mistake.

This immediate or nearly immediate, and easily perceived, feedback can decrease user frustration at assembly. In turn, by decreasing frustration, these features of the wearable cardiac device can increase compliance with wearing and using the wearable cardiac device. Moreover, by providing easily perceived feedback during assembly, the correct wearable cardiac device assembly is assured, meaning that the patient is protected from life-threatening arrhythmias by the device.

Additionally or alternatively, to effectively provide the treatment shocks or pulses described above, it is desirable that the assemblable elements, including the therapy and/or sensing electrodes provided in the device, appropriately contact the skin of the patient. For example, an acceptable contact pressure range at one or more therapy electrode-to-skin can be selected based upon a predetermined minimum range of pressure that provides adequate contact between the electrodes and the patient's skin to facilitate essentially complete transmission of an electric shock/pulse from the electrodes to the patient. As another example, an acceptable contact pressure range at one or more sensing electrode-to-skin interfaces can be selected based upon a predetermined minimum range of pressure that provides adequate contact between the electrodes and the patient's skin to facilitate ECG sensing functions with an acceptable signal-to-noise profile. To illustrate, an acceptable pressure range at the one or more electrode-to-skin interfaces can include pressures, in some implementations, between 0.25 psi and 0.62 psi; in some implementations, between 0.4 and 0.62 psi; or in some implementations, between 0.5 and 0.62 psi. The devices described herein may include features to provide local feedback, such as visual, tactile, or audible feedback at the assemblable element, when the pressure exerted on the assemblable element falls outside a predetermined acceptable range of pressure (e.g., 0.25 psi to 0.62 psi).

Further, in implementations, the assemblable elements of an electrode belt may be able to determine whether they have shifted or moved from a predetermined position (e.g., on the garment and/or with respect to the patient's anatomy) while the wearable cardiac device is being used by the patient. For example, a position verification sensor of an assemblable element may identify when the assemblable element has flipped over during use. The assemblable element may then alert the patient (e.g., via one or more local position feedback indicators disposed on the assemblable element) to fix the position of the assemblable element, which in turn protects the patient from life-threatening arrhythmias by the device.

FIG. 1 illustrates an example of a wearable cardiac device 100, according to implementations disclosed herein. As shown in FIG. 1, the wearable cardiac device 100 is external and wearable by a patient 104 around the patient's torso. Such a wearable cardiac device 100 can be, for example, capable and designed for moving with the patient 104 as the patient 104 goes about their daily routine. For instance, the wearable cardiac device 100 may be configured to be bodily-attached to the patient 104. As noted above, the wearable cardiac device 100 may be a wearable defibrillator or a wearable cardioverter defibrillator. In one example scenario, such wearable defibrillators can be worn nearly continuously or substantially continuously for an extended period of time, such as a week, two weeks, a month, two months, three months, six months, etc. at a time. During the period of time in which they are worn by the patient 104, the wearable defibrillators can be configured to continuously or substantially continuously monitor the vital signs of the patient 104 and can be configured to, upon determination that treatment is required, deliver one or more therapeutic electrical pulses to the patient 104. For example, such therapeutic shocks can be pacing, defibrillation, cardioversion, and/or transcutaneous electrical nerve stimulation (TENS) pulses.

As shown in FIG. 1, the wearable cardiac device 100 can include one or more of the following: a garment 101 configured to be worn about the patient's torso for an extended period of time and one or more assemblable elements. In implementations, assemblable elements may include one or more ECG electrodes 102 configured to be disposed on the garment 101 and further configured to sense ECG signals indicative of cardiac activity in the patient 104, one or more therapy electrodes 114a and 114b (collectively referred to herein as therapy electrodes 114) configured to be disposed on the garment 101, a signal processing unit 108 (e.g., a connection pod), a patient interface pod 110, or any combination of these. In examples, the assemblable elements are physically coupled to each other as an electrode belt (e.g., as shown by electrode belt 300 of FIG. 3). In examples, the electrode belt is coupled to a cardiac controller 106 via a connector (e.g., via connector 308 of FIG. 3). In implementations, the wearable cardiac device 100 may also include additional assemblable elements such as physiological sensors. Examples of physiological sensors include motion detectors configured to generate motion data indicative of physical activity performed by the patient 104, wear state sensors configured to detect a wear state of the wearable cardiac device 100, vibrational or bioacoustics sensors configured to generate bioacoustics signals for the heart of the patient 104, respiration sensors configured to generate respiration signals indicative of the respiration activity of the patient 104, and/or the like. In examples, some of the ECG electrodes 102, therapy electrodes 114, signal processing unit 108, patient interface pod 110, additional physiological sensors, etc. may be implemented as integrated elements rather than assemblable elements (e.g., elements integrated into the garment 101 and configured to communicate with the cardiac controller 106 and/or the assemblable electrode belt, as described below).

In examples, at least some of the assemblable elements or components of the wearable cardiac device 100 can be configured to be disposed on the garment 101 by being removably mounted on or affixed to the garment 101, such as by mating hooks, hook-and-loop fabric strips, receptacles (e.g., pockets), snaps (e.g., plastic or metal snaps), and the like. For instance, the ECG electrodes 102 may be removably attached to the garment 101 by hook-and-loop fabric strips on the ECG electrodes 102 and the garment 101, and the therapy electrodes 114 may be removably attached on the garment 101 by being inserted into the receptacles of the garment 101. In some examples, at least some of the components of the wearable cardiac device 100 can be permanently integrated into the garment 101, such as by being sewn into the garment or by being adhesively secured to the garment 101 with a permanent adhesive. In examples, at least some of the components may be connected to each other and/or to the cardiac controller 106 through cables, through sewn-in connections (e.g., wires woven into the fabric of the garment 101), through conductive fabric of the garment 101, and/or the like.

As noted above, the cardiac controller 106 can be operatively coupled to the ECG electrodes 102 and the therapy electrodes 114, which can be temporarily or removably affixed to the garment 101 (e.g., assembled into the garment 101 or removably attached to the garment 101, for example, using hook-and-loop fasteners) and/or permanently integrated into the garment 101 as discussed above. As shown in FIG. 1, the ECG electrodes 102 and/or the therapy electrodes 114 can be directly operatively coupled to the cardiac controller 106 and/or operatively coupled to the cardiac controller 106 through another assemblable element such as the signal processing unit 108. Component configurations other than those shown in FIG. 1 are also possible. For example, the ECG electrodes 102 can be configured to be attached at various positions about the body of the patient 104. In some implementations, the ECG electrodes 102 and/or at least one of the therapy electrodes 114 can be included on a single integrated patch and adhesively applied to the patient's body. In some implementations, the ECG electrodes 102 and/or at least one of the therapy electrodes 114 can be included in multiple patches and adhesively applied to the patient's body. Such patches may be in a wired (e.g., via the signal processing unit 108) or wireless connection with the cardiac controller 106. Such implementations may, in some case, change the nature, type, and/or number of assemblable elements that are part of the electrode belt. The devices, system, methods, and techniques described herein are used to facilitate assembly of the assemblable elements into the garment 101, and/or continuous or intermittent monitoring of the proper location or position of the assemblable elements.

In some implementations, the cardiac controller 106 may also be an assemblable element configured to be assembled into the garment 101. For example, the entire cardiac controller 106 as shown in FIG. 1 may be configured to be inserted into or attached to a receptacle of the garment 101, such as a pocket. As another example, the functions of the cardiac controller 106 may be dispersed among multiple cardiac controller units (e.g., a cardiac arrhythmia monitoring unit, a therapy delivery unit, a communications unit, an alarm module unit, etc., such as discrete units for two or more of the components shown in the electronic architecture of FIGS. 19 and 20). These multiple cardiac controller units may then be inserted into and/or attached to receptacles of the garment 101.

As discussed above, certain assemblable elements such as the ECG electrodes 102 can be configured to detect ECG signals indicative of cardiac activity of the patient 104. Example ECG electrodes 102 may include a metal electrode with an oxide coating such as tantalum pentoxide electrodes. For example, by design, the ECG electrodes 102 can include skin-contacting electrode surfaces that may be deemed polarizable or non-polarizable depending on a variety of factors including the metals and/or coatings used in constructing the electrode surface. All such electrodes can be used with the principles, techniques, devices, and systems described herein. For instance, the electrode surfaces can be based on stainless steel, noble metals such as platinum, or Ag—AgCl.

In implementations, the ECG electrodes 102 can be used with an electrolytic gel dispersed between the electrode surface and the patient's skin. In implementations, the ECG electrodes 102 can be dry electrodes that do not need an electrolytic material. As an example, such a dry electrode can be based on tantalum metal and having a tantalum pentoxide coating as is described above. Such dry electrodes can be more comfortable for long-term monitoring applications.

In implementations, the ECG electrodes 102 can include additional components such as accelerometers, acoustic signal detecting devices (e.g., vibrational sensors), and other measuring devices for recording additional parameters. For example, the ECG electrodes 102 can also be configured to detect other types of patient physiological parameters and acoustic signals, such as tissue fluid levels, heart vibrations, lung vibrations, respiration vibrations, patient movement, etc. In implementations, the wearable cardiac device 100 may include additional assemblable elements such as additional biophysical or physiological sensors or detectors separate from the ECG electrodes 102, such as separate motion detector(s), wear state detector(s), vibrational sensor(s), bioacoustics sensor(s), respiration sensor(s), temperature sensor(s), pressure sensor(s), and/or the like. In some examples, the therapy electrodes 114 can also be configured to include sensors configured to detect ECG signals as well as, or in the alternative, other physiological signals from the patient 104. In accordance with the principles of this disclosure, such biophysical or physiological sensors can implement devices, systems, methods, and techniques described herein to facilitate assembly of such biophysical or physiological sensors into the garment 101, and/or continuous or intermittent monitoring of the proper location or position of the biophysical or physiological sensors.

The signal processing unit 108 is an assemblable element that can, in some examples, include a signal processor configured to amplify, filter, and digitize cardiac signals, such as the ECG signals, prior to transmitting the cardiac signals to the cardiac controller 106. In examples, the signal processing unit 108 may be located on the small of the patient's back, as to on the patient's front as illustrated in FIG. 1. In such implementations, because the signal processing unit 108 is located on the small of the patient's back where the patient may be sensitive to feeling movement, the signal processing unit 108 can be configured to include one or more vibration motors to provide tactile notifications to the patient. For instance, the signal processing unit 108 can receive one or more signals from the cardiac controller 106 and provide a tactile alert to the patient 104 based on the one or more signals from the cardiac controller 106.

One or more therapy electrodes 114 can be configured to deliver one or more therapeutic cardioversion/defibrillation shocks to the body of the patient 104 when the wearable cardiac device 100 determines that such treatment is warranted based on the signals detected by the ECG electrodes 102 and processed by the cardiac controller 106. Example therapy electrodes 114 can include conductive metal electrodes such as stainless-steel electrodes that include, in certain implementations, one or more conductive gel deployment devices configured to deliver conductive gel between the metal electrode and the patient's skin prior to delivery of a therapeutic shock.

In implementations, the cardiac controller 106 may also be configured to warn the patient 104 prior to the delivery of a therapeutic shock, such as via output devices integrated into or connected to the cardiac controller 106, the signal processing unit 108, and/or the patient interface pod 110. In examples, the patient interface pod 110 is an assemblable element that can be removably attached to or disposed on the garment 101. For example, the patient interface pod 110 can be secured to a hook-and-loop fastener and/or a plastic or metal snap connector disposed on the shoulder strap of the garment 101 (e.g., shoulder strap 202 shown in FIG. 2). The warning, for example, may be auditory (e.g., a siren alarm, a voice instruction indicating that the patient 104 is going to be shocked), visual (e.g., flashing lights on the cardiac controller 106), haptic (e.g., a tactile, buzzing alarm generated by the signal processing unit 108), and/or the like. If the patient 104 is still conscious, the patient 104 may be able to delay or stop the delivery of the therapeutic shock. For example, the patient 104 may press one or more buttons on the patient interface pod 110 to indicate that the patient 104 is still conscious. In response to the patient 104 pushing the one or more buttons, the cardiac controller 106 may delay or stop the delivery of the therapeutic shock.

Figure 2:
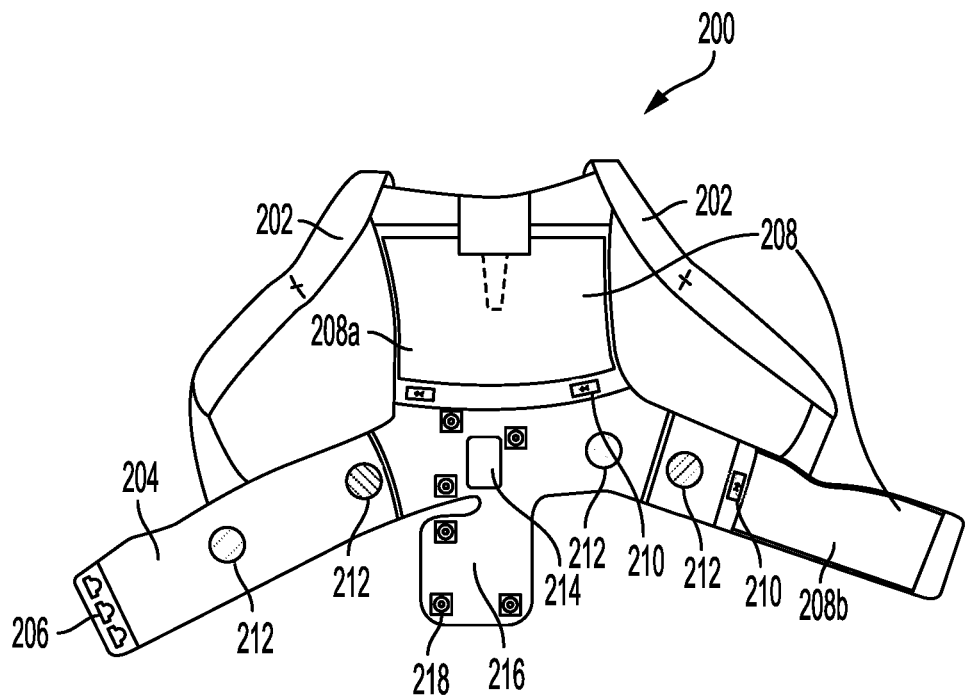
FIG. 2 depicts an example wearable garment configured to be worn continuously by a patient.

Example implementations of a wearable cardiac device in accordance with the devices, systems, techniques, and methods disclosed herein are shown in FIGS. 2-5. FIG. 2 illustrates an embodiment of a garment 200 configured to be worn by a patient for an extended period of time and for receiving assemblable elements as described herein. The garment 200 shown in FIG. 2 includes shoulder straps 202 configured to be worn over the patient's shoulders and a band 204 configured to wrap around the patient's torso. Once on the patient 104, the garment 200 may be fixed in place with a clasp 206, such as a clasp 206 provided on the band 204 as illustrated (e.g., in order to secure the garment 200 and some or all of the assemblable elements against the body of the patient 104). For instance, the clasp 206 may include a first clasp portion located at one end of the band 204 as shown in FIG. 2 configured to removably attach to or mate with a second clasp portion located at the other end of the band 204 (e.g., on the side of the garment 200 not shown in FIG. 2, the side opposite from the pocket 208 on the band 204). As such, the clasp 206 may include mating hooks and eyes, hook-and-loop fabric strips, buttons, snaps, and/or the like. In implementations, the clasp 206 may be configured with multiple settings such that the patient 104 can adjust the tightness of fit of the garment 200 and/or the positioning or force applied to some or all of the assemblable elements against the body of the patient 104. To illustrate, as an example, the clasp 206 may include a row of hooks provided on one end of the band 204 and several rows of eyes provided on one the other end of the band 204, with each row of eyes a spaced distanced from the others. The patient 104 can then mate the hooks to the row of eyes that provides for the best fit of the band 204 (and the assemblable elements) on the patient 104. As another example, the clasp 206 may include a strip of hook fabric on one end of the band 204 and a longer strip of loop fabric on the other end of the band 204 such that the patient 104 can attach the hook fabric to a spot on the loop fabric that provides for the best fit of the band 204 on the patient 104.

As noted, the garment 200 is configured to receive assemblable elements or components of a wearable cardiac device. In implementations, the garment 200 may be configured to receive assemblable elements or components of an electrode belt, such as the electrode belt 300 shown in FIG. 3. The electrode belt 300 includes a number of assemblable elements configured for assembly into the garment 200 before the wearable cardiac device, which includes the electrode belt 300 assembled into the garment 200, is worn and used by the patient 104. In implementations, the electrode belt 300 is configured to facilitate sensing electrical signals associated with cardiac activity of the patient 104 and/or deliver one or more therapeutic pulses to the patient 104. Accordingly, as illustrated in FIG. 3, the electrode belt 300 may include at least one sensing electrode 302 configured to sense electrical signals associated with cardiac activity of the patient 104 (e.g., configured similarly to ECG electrodes 102 discussed with reference to FIG. 1) and/or at least one therapeutic electrode 304 configured to deliver one or more therapeutic pulses to the patient 104 (e.g., configured similarly to the therapy electrodes 114 discussed with reference to FIG. 1).

Figure 3:
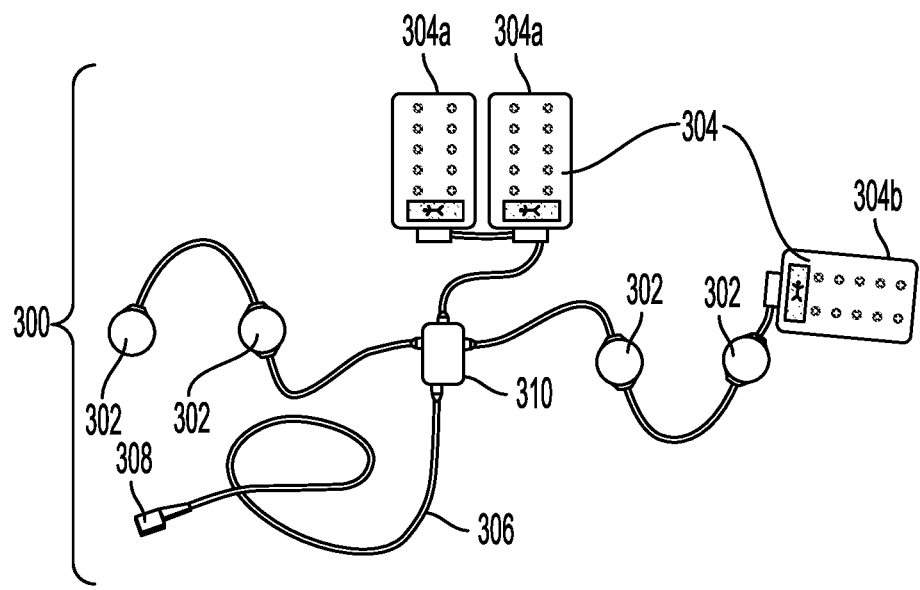
FIG. 3 depicts an example electrode belt configured to be assembled into a wearable garment.

In implementations, the assemblable elements of the electrode belt 300 may include both the sensing electrodes 302 and the therapeutic electrodes 304, as shown in FIG. 3. In other implementations, the assemblable elements of the electrode belt 300 may include only sensing electrodes 302 or only therapeutic electrodes 304. For example, the assemblable elements of the electrode belt 300 may include only therapeutic electrodes 304, and the garment 200 may instead be provided with sensing electrodes that are already permanently integrated into the garment 200. Such permanently integrated sensing electrodes may be, for instance, sensing electrode discs that are sewn or permanently adhered to the garment 200 or conductive thread sewn into the garment 200.

In implementations, the assemblable elements of the electrode belt 300 may include only sensing electrodes 302, and the garment 200 may be provided with therapy electrodes permanently integrated into the garment 200. To illustrate, the garment 200 may include therapy electrode pads sewn or permanently adhered to the garment 200. In such implementation, the garment 200 may include pockets or other compartments for replaceable gel packs provided with electrolytic gel and disposed proximate the permanently integrated therapy electrodes. In these implementations, the assemblable elements include the replaceable gel packs provided with the electrolytic gel and disposed proximate the permanently integrated therapy electrodes. The gel packs may be configured to deploy conductive gel in the interface between the permanently integrated therapy electrodes and the patient's skin in advance of a therapeutic shock, as discussed above with reference to FIG. 1. In this regard, the replaceable gel packs can include local assembly feedback circuitry configured to provide feedback regarding whether the replaceable gel pack is correctly or incorrectly assembled into the garment 200 (e.g., according to the systems, methods, techniques, and implementations for local assembly feedback circuitry discussed below).

Figure 26:
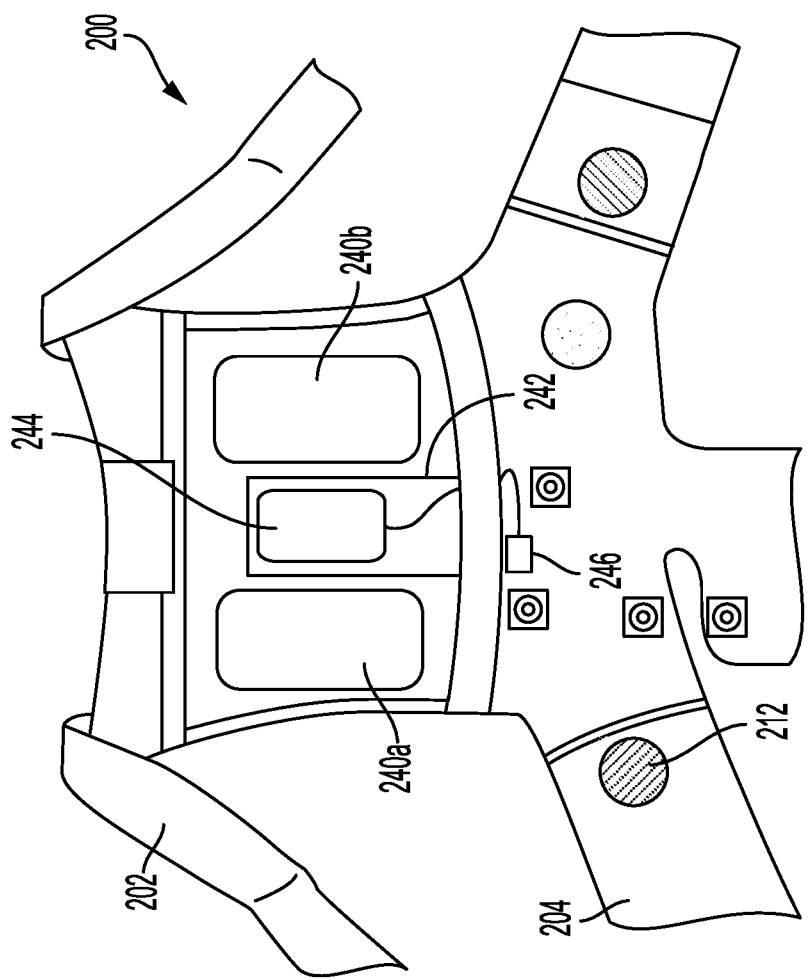
FIG. 26 depicts an example wearable garment with an assemblable gel pack.

An example of the garment 200 including permanently integrated therapy electrodes is shown in FIG. 26. In the example illustrated in FIG. 26, the back side of the garment 200 is provided with therapy electrode pads 240*a* and 240*b* (collectively 240) permanently disposed on the garment 200. For example, therapy electrodes pads 240 may be configured similarly to the therapeutic electrodes sewn into the garment 200 or permanently adhered to the garment 200. The back side of the garment 200 also includes a gel pack pocket 242 configured to receive a replaceable gel pack 244 as an assemblable element. In implementations, the replaceable gel pack 244 is configured to disposed next to the permanently integrated therapy electrode pads 240*a* and 240*b* such that the replaceable gel pack 244 can disperse conductive gel into the interface between the therapy electrode pads 240 and the patient's skin. In implementations, the garment 200 may include multiple gel pack pockets 242 configured to receive multiple replaceable gel packs 244. For instance, the garment 200 may include two gel pack pockets 242, each disposed next to a therapy electrode pad 240 and each configured to receive a replaceable gel pack 244.

The dispersal of the conductive gel may be controlled by a controller (e.g., the cardiac controller 106 shown in FIG. 1 or the controller 400 shown in FIG. 4 and discussed below), which the replaceable gel pack 244 may be configured to be electrically coupled to via a gel pack connector 246. As an example, the gel pack connector 246 may be configured to connect directly to the controller. As another example, the gel pack connector 246 may be configured to connect indirectly to the controller, such as by connecting to the electrode belt 300. As another example, the gel pack connector 246 may not include a gel pack connector 246 and may instead be an integrated part of an electrode belt, such as part of the electrode belt 300.

Figure 4:
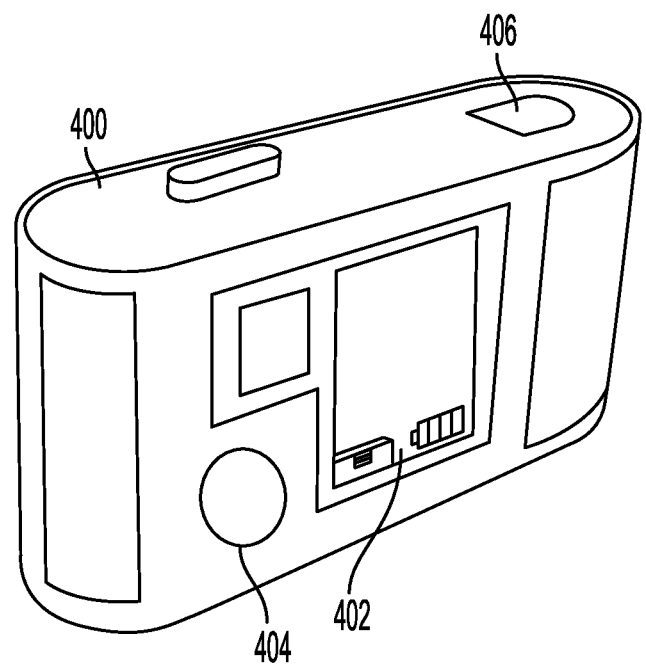
FIG. 4 depicts an example controller configured to be used with a wearable garment and an electrode belt.

The electrode belt 300 includes wires 306 connecting the assemblable elements of the electrode belt 300 to each other and, ultimately, to a connector 308. In turn, the connector 308 is configured to removably attach to a controller configured to monitor and treat the patient 104, such as the controller 400 shown in FIG. 4. The controller 400 may be configured similarly to the cardiac controller 106 described with reference to FIG. 1. Additional details about implementations of the controller 400 are also provided below with reference to FIGS. 18 and 19. The connector 308 may be configured to connect into a mating slot on the controller 400 as shown in FIG. 4 such that the controller 400 can receive signals from (e.g., signals containing information about electrical activity sensed from the patient 104) and transmit signals to (e.g., signals instructing the delivery of one or more therapeutic pulses) to electrode belt 300. The controller 400 is configured to be worn by the patient 104, such as within a holster with a shoulder strap. Alternatively, as described above with reference to the cardiac controller 106 of FIG. 1, in implementations the controller 400 may be configured as one or more assemblable elements also configured to be assembled into the garment 200.

Returning to FIG. 3, in implementations, the electrode belt 300 includes one or more assemblable elements in addition to the sensing electrodes 302 and/or therapeutic electrodes 304. For example, as shown in FIG. 3, the electrode belt 300 may include a signal processing unit 310 configured to electrically connect at least one electrode to the controller 400. For instance, the signal processing unit 310 may connect the sensing electrodes 302 and/or the therapeutic electrodes 304 to the controller 400 via the wires 306 and the connector 308 when the connector 308 is mated to the controller 400. In some implementations, the signal processing unit 310 may be configured to connect both the sensing electrodes 302 and the therapeutic electrodes 304 to the controller 400, as illustrated in FIG. 3. In some implementations, the signal processing unit 310 may be configured to only connect the sensing electrodes 302 or only the therapeutic electrodes 304 to the controller 400. For example, the electrode belt 300 may be configured differently from the electrode belt 300 shown in FIG. 3 (e.g., with the signal processing unit 310 provided between either the sensing electrodes 302 or the therapeutic electrodes 304 but not both), and/or the electrode belt 300 may not include the sensing electrodes 302 or the therapeutic electrodes 304.

In implementations, the signal processing unit 310 may be configured to process data and/or signals received from the sensing electrodes 302 before transmitting the processed data and/or signals to the controller 400. As an example, the signal processing unit 310 may be configured to reduce and/or remove noise in the signals received by the sensing electrodes 302 (e.g., by using signals from a ground electrode, which may be one of the sensing electrodes 302, one of the therapeutic electrodes 304, and/or may be provided elsewhere on the wearable cardiac device). As another example, the signal processing unit 310 may be configured to digitize the signals received by the sensing electrodes 302 (e.g., by an analog-to-digital converter).

Additionally or alternatively, in implementations, the signal processing unit 310 may be configured control at least part of the delivery of therapeutic pulses via the therapeutic electrodes 304. As an example, the signal processing unit 310 may receive a signal from the controller 400 initiating a therapy delivery sequence. The signal processing unit 310 may send a signal to the therapeutic electrodes 304 to activate the deployment of conductive electrolytic gel at the therapeutic electrodes 304 (e.g., from a permanent or removable gel pack incorporated as part of the therapeutic electrodes 304, from a removable gel pack configured as an assemblable element, such as removable gel pack 244 shown in FIG. 26). The signal processing unit 310 may then receive one or more therapeutic charges from the controller 400 and convey the one or more therapeutic charges to the therapeutic electrodes 304 for delivery of one or more therapeutic pulses to the patient 104.

In implementations, the controller 400 is configured to generate an ECG signal based on the electrical signals sensed by the sensing electrodes 302 and determine whether the patient 104 is experiencing a treatable cardiac arrhythmia using the ECG signal. If the controller 400 determines that the patient 104 is experiencing a treatable cardiac arrhythmia, the controller 400 may further generate one or more therapeutic pulses for delivery to the patient 104 via the at least one therapeutic electrode 304. Before generating the one or more therapeutic pulses, however, the controller 400 may activate one or more alarms for a predetermined alarm period to warn the patient 104 that a therapeutic shock is imminent. The alarms may be delivered to the patient 104 via one or more components of the wearable cardiac device. As an example, the controller 400 may include a touch screen 402 configured to display a visual alarm, such as an icon or text indicating the impending therapeutic shock. As another example, the controller 400 may include a speaker 404 configured to emit an audio alarm. The audio alarm may be, for instance, a bell, a gong, a verbal warning or instruction (e.g., warning the patient 104 and any bystanders of the impending therapeutic shock, instructing the patient 104 to push a response button to delay or cancel the impending therapeutic shock, instructing bystanders to stand back from the patient 104, and/or so on). As another example, as noted above, the signal processing unit 310 may include a tactile device configured to vibrate to provide a haptic alarm. The one or more alarms may, in implementations, be combinations of visual, audio, and/or haptic alarms that may escalate over time. For instance, an audio alarm may become louder over a predetermined alarm period.

If the patient 104 is still conscious when the controller 400 initiates one or more alarms, the patient 104 may be able to push one or more response buttons to signal to the controller 400 that the one or more therapeutic pulses should be delayed or cancelled. For example, the controller 400 may include response buttons 406 provided on opposite sides of the controller 400 that the patient 104 must push simultaneously to delay or cancel the therapeutic shock. In implementations, the wearable cardiac device may include a separate response button unit that contains the one or more response buttons, similar to the patient interface pod 110 shown in FIG. 1. As an illustration, the electrode belt 300 may include a wired response button unit (e.g., a response button unit incorporated as an integrated part of the electrode belt 300 or a response button unit that connects to the signal processing unit 310). The response button unit may be configured to removably connect to the garment 200 (e.g., similar to the patient interface pod 110 attached to the garment 101 in FIG. 1, via a clip, snaps, buckles, etc.) or to clothes of the patient (e.g., via a clip). As another illustration, the wearable cardiac device may include a wireless response button unit, for example, implemented as a watch or wristband that the patient wears along with the garment 200. As another illustration, a patient user device, such as a smart phone, may serve as the response button unit. For example, the controller 400 may communicate with the smart phone (e.g., via Bluetooth®, via cellular networks, etc.) and cause the smart phone to display a button, a link, or so on that the patient 104 must press to delay or cancel the therapeutic shock. In implementations, the wearable cardiac device may include combinations of the above types of response buttons.

Figure 27:
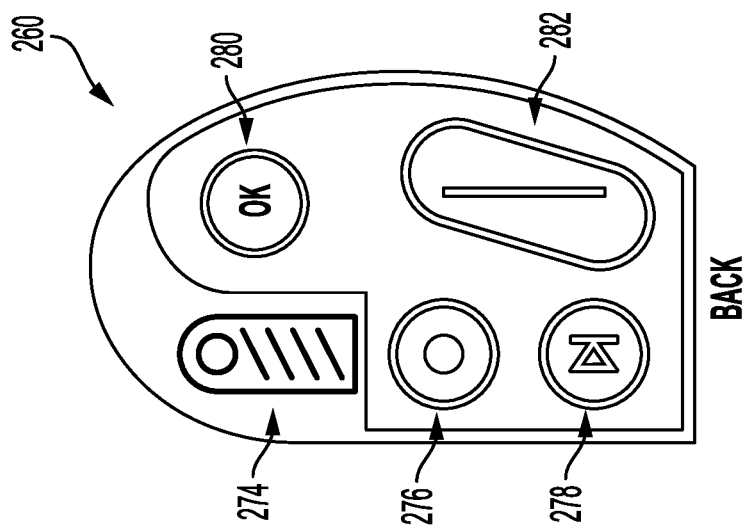
FIG. 27 depicts an example response button unit.
Figure 27:
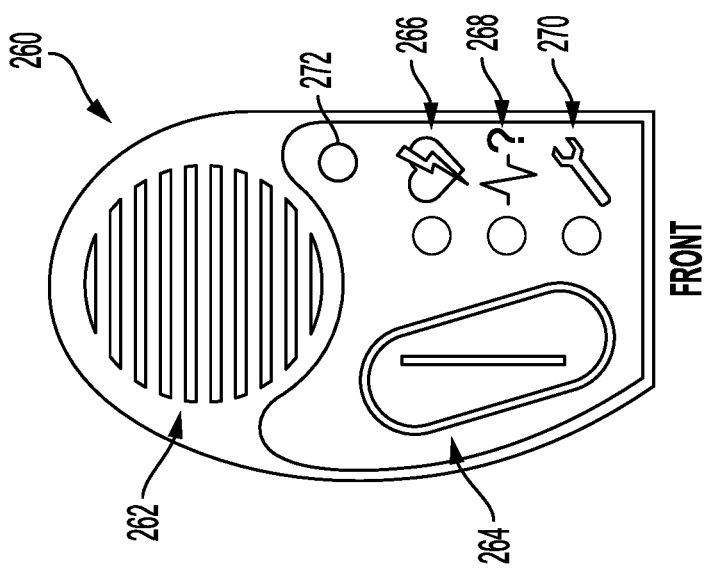

FIG. 27 illustrates an example of a response button unit 260. As shown in FIG. 27, the front of a response button unit 260 may include a speaker 262, a first response button 264, and a number of indicator lights 266, 268, 270, and 272. The back of the response button unit 260 may include a clip 274 configured to attach the response button unit 260 to the garment 200 or to clothing of the patient 104, a record button 276, a transmit button 278, an OK button 280, and a second response button 282. The speaker 262 and the indicator lights 266, 268, 270, and 272 may be configured to provide alerts to the patient 104 in advance of the wearable cardiac device delivering a therapeutic shock to the patient 104 and/or as one more local assembly feedback indicators, as discussed in further detail below. For instance, the speaker 262 may be configured to emit alarms warning the patient 104 of an impending shock, and the indicator light 266 may be configured to light up red when a treatable cardiac arrhythmia has been detected in the patient 104. In addition, the speaker 262 may be configured to emit a sound and the indicator light 272 may be configured to light up to provide feedback on whether the response button unit 260 has been correctly assembled into the garment 200, using the techniques described in more detail below. The indicator lights 266, 268, 270, and 272 may, additionally or alternatively, be configured to provide additional feedback to the patient regarding the functioning of the wearable cardiac device. To illustrate, the indicator light 268 may be configured to light up yellow to indicate that one or more of the ECG signals are not clear, and the indicator light 270 may be configured to light up yellow to indicate that the wearable cardiac device requires attention or service.

In response to receiving an alert of an impending therapeutic shock, the patient 104 may also be able to press the first response button 264 and the second response button 282 simultaneously to indicate to the wearable cardiac device that the patient 104 is still conscious. The patient 104 may also be able to press the record button 276 (e.g., for a predetermined amount of time, such as three seconds) to record an ECG segment, for instance, that a clinician can review later. For example, the patient 104 may press the record button 276 if the patient 104 is experiencing a symptom of cardiac dysfunction, such as a racing heart rate. The patient may use the other buttons of the response button unit 260 to interact with the wearable cardiac device in other ways. As an illustration, the patient 104 may press the transmit button 278 to download or upload information to a remote server in communication with the wearable cardiac device, such as to upload an ECG segment recorded by the patient 104 using the record button 276 to the remote server for the patient's doctor to review. As another illustration, the patient 104 may be able to press the OK button 280 to interact with the cardiac controller (e.g., the controller 400), e.g., to display a status on the cardiac controller.

Returning to FIG. 4, in implementations, the controller 400 may also send outputs and receive inputs from the patient 104 or other user unrelated to an impending therapeutic shock. To illustrate, the controller 400 may display a settings menu to a user via the touch screen 402 that the user (e.g., a caregiver for the patient 104, such as a doctor or device technician) can use to input settings for the wearable cardiac device. Examples of settings may include energy levels for the one or more therapeutic shocks, the timing between therapeutic shocks, the length of the predetermined alarm period, and/or the like.

As noted above, the electrode belt 300 includes one or more assemblable elements configured to be assembled into the garment 200 before the wearable cardiac device is worn and used by the patient 104 to protect the patient 104 from treatable cardiac arrhythmias. For example, in implementations and as shown in FIG. 2, the garment 200 may include pockets 208 for receiving the therapeutic electrodes 304 of the electrode belt 300, which may be secured (after the therapeutic electrodes 304 have been inserted into the pockets 208) by pocket snaps 210. The pockets 208 may include multiple sets of pockets, such as pockets 208a provided on the portion of the garment 200 configured to lie against the patient's back and a pocket 208b provided on the band 204. In implementations, the garment 200 may include electrode fasteners 212 configured to receive the sensing electrodes 302 of the electrode belt 300. In implementations, the garment 200 may also include an enclosure 214 for the signal processing unit 310 of the electrode belt 300. As shown in FIG. 2, the enclosure 214 may include a fabric flap 216 configured to be folded over the signal processing unit 310 and secured in place via flap snaps 218. Alternatively, or additionally, the location of the enclosure 214 shown in FIG. 2 may include a housing that the signal processing unit 310 is configured to removably snap or otherwise attach into.

Figure 5:
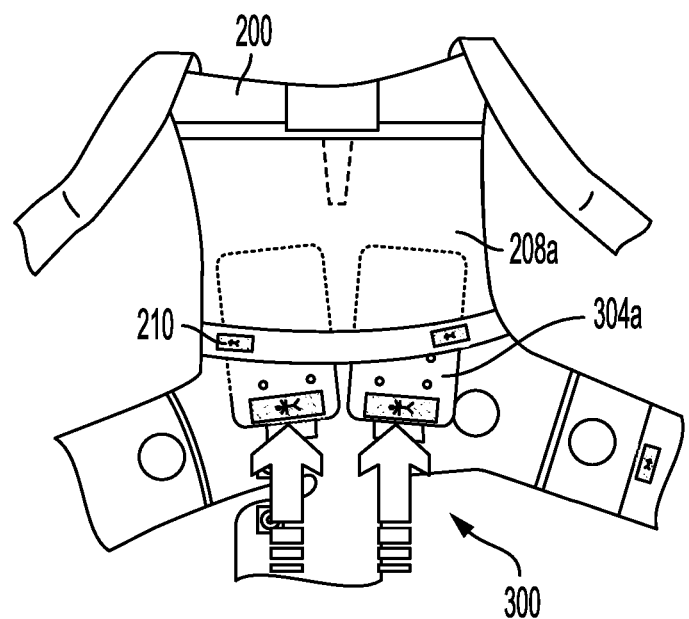
FIG. 5 depicts an example of assembling an electrode belt into a wearable garment.
Figure 6:
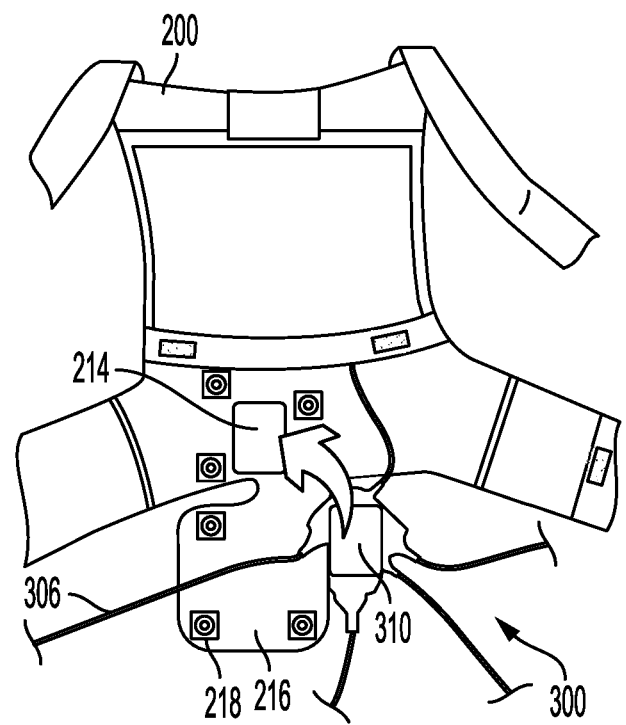
FIG. 6 depicts an example of assembling an electrode belt into a wearable garment.
Figure 7:
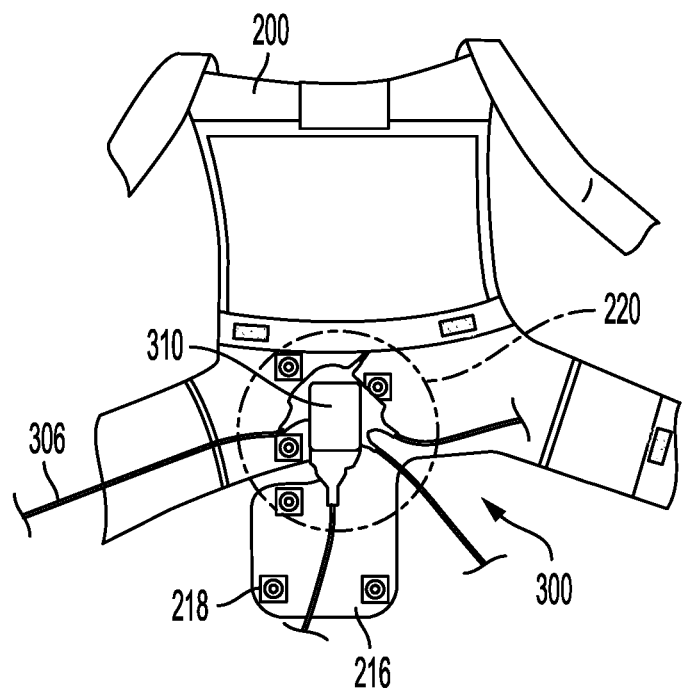
FIG. 7 depicts an example of assembling an electrode belt into a wearable garment.
Figure 8:
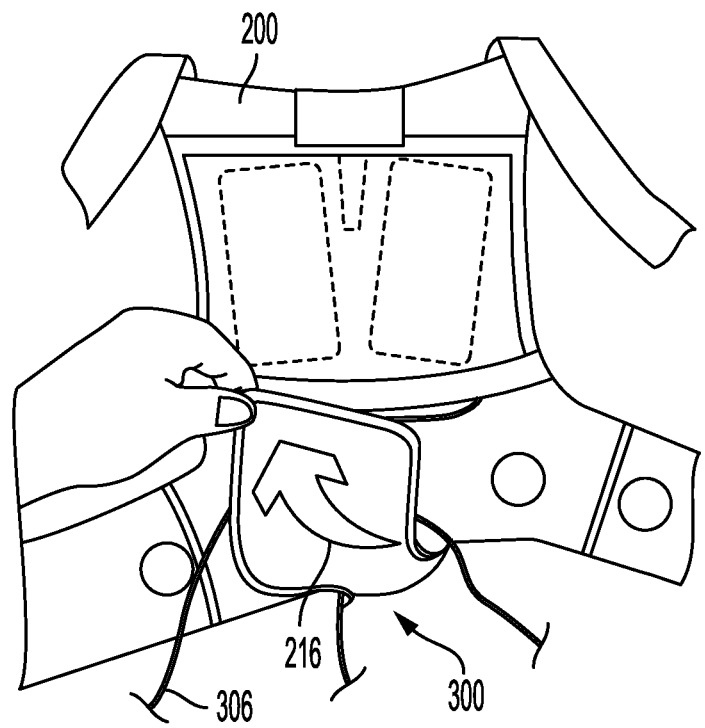
FIG. 8 depicts an example of assembling an electrode belt into a wearable garment.
Figure 9:
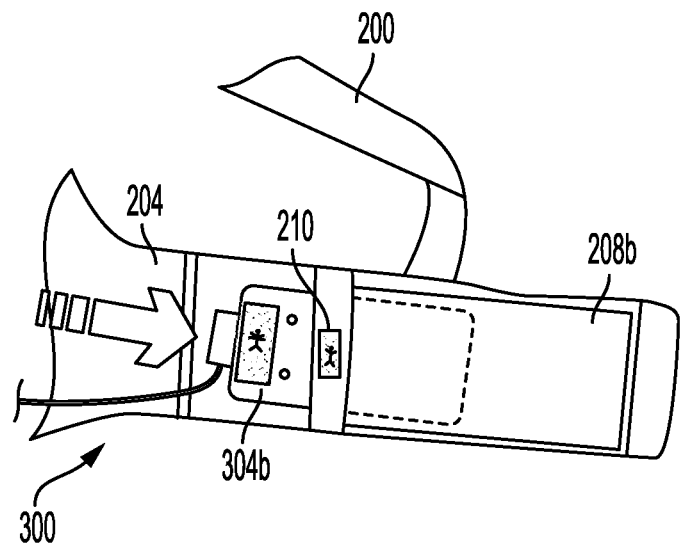
FIG. 9 depicts an example of assembling an electrode belt into a wearable garment.

An example assembly process for a wearable cardiac device including the garment 200 and the electrode belt 300 is illustrated in FIGS. 5-10. To assemble the electrode belt 300 into the garment 200, first, the patient 104 or other user inserts therapeutic electrodes 304a into the pockets 208a provided on the portion of the garment 200 configured to contact the patient's back, as shown in FIG. 5. Once the therapeutic electrodes 304a are inserted into the pockets 208a, the patient 104 or other user may secure them in place by snapping the pocket snaps 210 of the pockets 208a closed. The patient 104 or other user then places the signal processing unit 310 in the enclosure 214 as illustrated in FIG. 6. In some implementations, placing the signal processing unit 310 in the enclosure 214 may include placing the signal processing unit 310 on the fabric flap 216 at the location shown in FIG. 6. In other implementations, placing the signal processing unit 310 in the enclosure 214 may include snapping the signal processing unit 310 into a housing provided at the enclosure 214 location shown in FIG. 6. In implementations, correctly placing the signal processing unit 310 in the enclosure 214 may include arranging the wires 306 of the electrode belt 300 within the enclosure 214, such as according to the arrangement 220 shown in FIG. 7. For example, the patient 104 or other user may place the wires to run between the flap snaps 218 of the enclosure 214, as illustrated in FIG. 7. Once the signal processing unit 310 is placed in the enclosure 214, the patient 104 or other user may close the fabric flap 216 over the signal processing unit 310, as shown in FIG. 8, and secure the fabric flap 216 in place through the flap snaps 218. As shown in FIG. 9, the patient 104 or other user also inserts the final therapeutic electrode 304b into the pocket 208b provided on the band 204 of the garment 200, securing the therapeutic electrode 304b in place by snapping closed the pocket snaps 210 of the pocket 208b.

Figure 10:
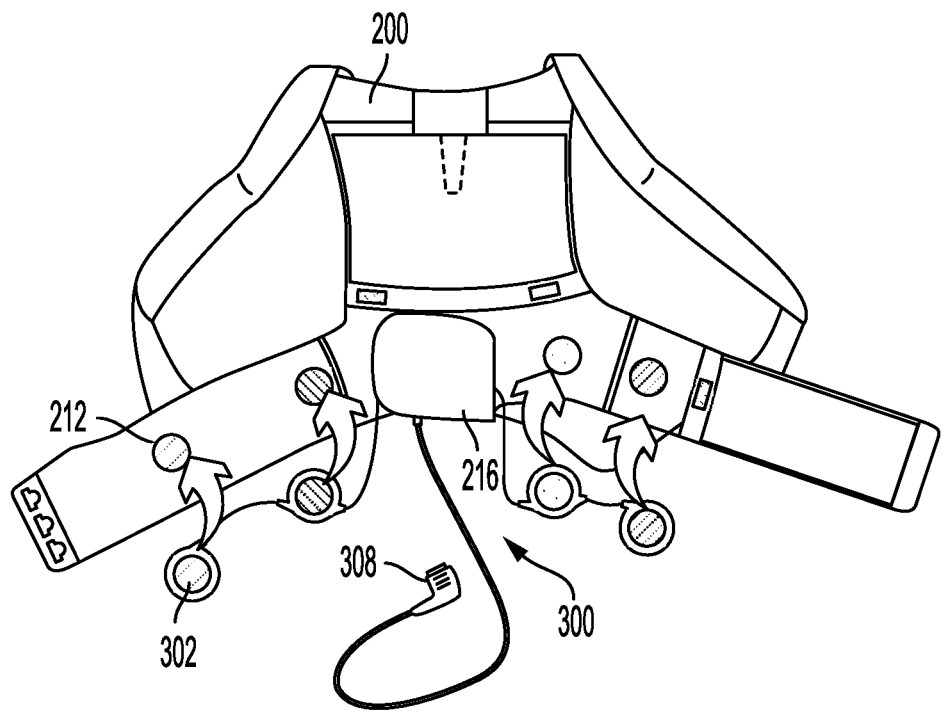
FIG. 10 depicts an example of assembling an electrode belt into a wearable garment.

Finally, as illustrated in FIG. 10, to finish the assembly of the assemblable elements of the electrode belt 300 within the garment 200, the patient 104 or other user places the sensing electrodes 302 on the electrode fasteners 212 of the garment 200. In implementations, the sensing electrodes 302 may be removably attached to the electrode fasteners 212 using any of a variety of removable attachment mechanisms. For example, a back side opposite to a sensing surface of each sensing electrode 302 may include hook or loop fabric configured to be adhered to loop or hook fabric of a corresponding electrode fastener 212. As another example, each electrode fastener 212 may include a pocket (e.g., with a conductive surface) configured to receive a sensing electrode 302. As another example, each electrode fastener 212 may include a housing that a sensing electrode 302 may be popped into, screwed into, etc. In implementations, each of the sensing electrodes 302 may be configured to be placed onto a specific corresponding electrode fastener 212 as shown in FIG. 10. To illustrate to the patient 104 or other user which sensing electrode 302 should be placed on which electrode fastener 212, each sensing electrode 302 may be provided with a color, a shape, a size, a symbol, and/or the like that matches a corresponding color, shape, size, symbol, and/or the like on the correct electrode fastener 212 the sensing electrode 302 should be affixed to.

Once the electrode belt 300 is correctly assembled into the garment 200, the connector 308 may be plugged into the controller 400, and the patient 104 may put on the garment 200. For example, the garment assembly shown in FIGS. 5-10 is performed with the assemblable elements of the electrode belt 300 being inserted onto the inner surface of the garment 200 configured to be placed against the patient's skin when worn. As such, once the assembly is finished, the patient 104 may put on the assembled garment 200 with the inner surface shown in FIGS. 5-10 against their skin, securing the garment in place using the clasp 206.

FIGS. 5-10 show an example of how the electrode belt 300 may be assembled into the garment 200, but other assembly steps or methods may be used. To illustrate, as discussed above, the electrode belt 300 may not include sensing electrodes 302 in some implementations. Instead, the sensing electrodes may be an integrated part of the garment 200. In such implementations, the assembly of the electrode belt 300 into the garment 200 may not include the step shown in FIG. 10. As another illustration, while the assembly of the electrode belt 300 into the garment 200 shown in FIGS. 5-10 is done with the assemblable elements of the electrode belt 300 being inserted or attached to the inner surface of the garment 200 configured to be placed against the patient's skin, in some implementations, the assemblable elements of the electrode belt 300 may be inserted or attached to the outer surface of the garment 200 configured to face away from the patient's skin when worn. For instance, the pockets 208 may be additionally or alternatively accessible from the outer surface of the garment 200, the enclosure 214 may be provided on the outer surface, and/or the electrode fasteners 212 may include an aperture whereby the sensing surface of the sensing electrodes 302 may contact the patient's skin surface when the sensing electrodes 302 are attached to the electrode fasteners 212 via the outer surface of the garment 200.

As another illustration, in some implementations and as discussed above, the electrode belt 300 may include a separate response button unit similar to the patient interface pod 110, such as the response button unit 260 shown in FIG. 27. As such, the assembly of the electrode belt 300 into the garment 200 may include attaching the response button unit to the garment 200. For example, the response button unit may be inserted the response button unit into a pocket on a strap 202 of the garment 200, snapped into the garment 200 using mating snaps on the response button unit and a strap 202 of the garment 200, clipped onto the garment 200 using a clip on the response button unit, and/or the like. Alternatively, the response button unit may be attached to the patient's clothing, such as by a clip on the response button unit, once the patient 104 puts on the assembled garment 200. In implementations, the response button unit may be part of the electrode belt 300, such as a permanent part of the electrode belt 300 or connectable to the electrode belt 300 (e.g., by plugging the response button unit into the signal processing unit 310). In implementations, the response button unit may be configured as an assemblable element separate from the electrode belt 300. For instance, the response button unit may be assemblable into the garment 200 and connect directly into the controller 400.

In examples, if the assemblable elements of the electrode belt 300 are assembled into the garment 200 incorrectly, the wearable cardiac device may not function properly when worn by the patient 104. To help ensure that the patient 104 or other user assembles the electrode belt 300 correctly, as well as guide the patient 104 or other user to fix any mistakes they might have made when assembling the electrode belt 300 into the garment 200, at least one, some, or all of the assemblable elements of the electrode belt 300 may include local assembly feedback circuitry to detect whether the respective assemblable element has been correctly assembled. The assemblable elements of the electrode belt 300 that may include local assembly feedback circuitry may include the sensing electrodes 302, the therapeutic electrodes 304, the signal processing unit 310, a response button unit, a removable gel pack 244, components of the controller 400, and/or the like.

In embodiments, the local assembly feedback circuitry may include at least an assembly verification sensor and one or more local assembly feedback indicators locally disposed on the assemblable element. The assembly verification sensor may be configured to sense whether the assemblable element has been correctly assembled into the garment 200. Each local assembly feedback indicator is configured to provide a human-discernable feedback alert indicating whether the assemblable element is correctly assembled into the garment 200 (e.g., to provide an alert when the assemblable element is correctly assembled into the garment 200 and/or to provide an alert when the assemblable element is incorrectly assembled into the garment 200). The local assembly feedback circuitry may be provided, for example, within or at least partially within a housing of its respective assemblable element (e.g., within the housing of a sensing electrode 302 but with an aperture through which an LED feedback indicator may be placed so it can be seen by the patient 104 or other user assembling the electrode belt 300 into the garment 200).

Figure 11:
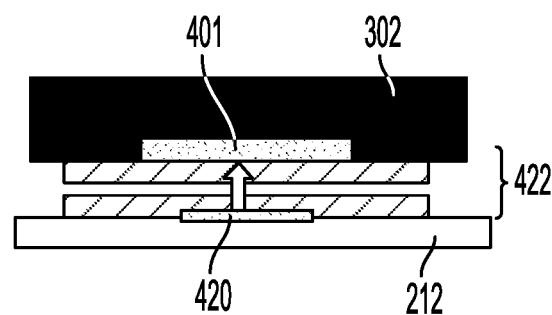
FIG. 11 depicts an example of an assembly verification sensor.

An example of an assembly verification sensor provided on a sensing electrode 302 is illustrated in FIG. 11. In the example of FIG. 11, the assembly verification sensor is a near-field communication (NFC) reader or sensor 401 incorporated as part of the sensing electrode 302. The NFC reader or sensor 401 can be configured to operate based on a set of RF-based communication protocols over a distance of between around 0.1 cm to around 15 cm, in a frequency range of around 10 MHz to around 20 MHz (e.g., 13.56 MHz, based on the ISO/IEC 18000-3 air interface Standard at data rates ranging from 106 to 424 kbit/s). The NFC reader 401 is configured to sense the presence of an NFC tag 420 provided at the corresponding electrode fastener 212 on the garment 200 when assembled into the garment 200 (e.g., via hook-and-loop fabric strips 422 on the back of the sensing electrode 302 and at the electrode fastener 212). If the NFC reader 401 does not sense the presence of the NFC tag 420, or if the NFC reader 401 senses the presence of the wrong NFC tag 420, when the sensing electrode 302 is assembled onto the electrode fastener 212, the local assembly feedback circuitry may activate one or more local assembly feedback indicators to alert the patient 104 or other user assembly the electrode belt 300 into the garment 200 that the sensing electrode 302 is incorrectly assembled.

As an example use case, each sensing electrode 302 may include an NFC reader 401, and each electrode fastener 212 may include a unique NFC tag 420. If a sensing electrode 302 is correctly assembled into its corresponding electrode fastener 212, the NFC reader 401 senses the NFC tag 420 corresponding to the sensing electrode 302. The local assembly feedback circuitry of the sensing electrode 302 thus determines that the sensing electrode 302 has been correctly assembled into the garment 200 and, depending on the local assembly feedback indicator configuration, does not activate any local assembly feedback indicators or activates a local assembly feedback indicator alerting the patient 104 or other user that the sensing electrode 302 has been correctly assembled (e.g., a green LED provided on the sensing electrode 302).

On the other hand, if the sensing electrode 302 is incorrectly assembled into its corresponding electrode fastener 212, the NFC reader 401 senses the absence of the NFC tag 420 corresponding to the sensing electrode 302 and/or senses an NFC tag 420 corresponding to one of the other sensing electrodes 302. The local assembly feedback circuitry of the sensing electrode 302 therefore determines that the sensing electrode 302 has been incorrectly assembled into the garment 200 and, depending on the local assembly feedback indicator configuration, activates a local assembly feedback indicator alerting the patient 104 or other user that the sensing electrode 302 has been incorrectly assembled (e.g., a red LED provided on the sensing electrode 302) or does not activate any local assembly feedback indicators. Once the patient 104 or other user corrects the placement of the sensing electrode 302 by moving the sensing electrode 302 to the correct electrode fastener 212, the NFC reader 401 senses the correct NFC tag 420. Depending on the local assembly feedback indicator configuration, the local assembly feedback circuitry of the sensing electrode 302 may then turn off a local assembly feedback indicator, turn on a local assembly feedback indicator, and/or modify a human-discernable feedback alert. For example, the local assembly feedback circuitry may turn off a red LED indicating that the sensing electrode 302 has been incorrectly assembled, turn on a green LED indicating that the sensing electrode 302 has been correctly assembled, and/or switch an LED from a red to a green setting.

Figure 12:
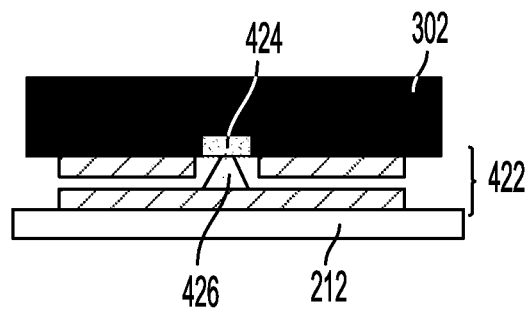
FIG. 12 depicts an example of an assembly verification sensor.

Another example of an assembly verification sensor provided on a sensing electrode 302 is illustrated in FIG. 12. In FIG. 12, the assembly verification sensor is a photoelectric sensor 424 incorporated as part of the sensing electrode 302. The electrode fastener 212 on the garment 200 includes a color tag 426 configured to be sensed by the photoelectric sensor 424 (e.g., through an aperture in the hook-and-loop fabric strips 422, as shown in FIG. 12). For example, each electrode fastener 212 may include loop fabric in a specific color. The photoelectric sensor 424 of each sensing electrode 302 may thus be configured to sense the color of the loop fabric of the electrode fastener 212 once the sensing electrode 302 has been attached to the electrode fastener 212. If the sensed color is the correct color corresponding to the sensing electrode 302, depending on the local assembly feedback configuration, the local assembly feedback circuitry of the sensing electrode 302 may refrain from activating one or more local assembly feedback indicators, activate one or more local assembly feedback indicators, and/or modify an activated local assembly feedback indicator to indicate that the sensing electrode 302 is correctly positioned. Additionally or alternatively, if the sensed color is an incorrect color (e.g., a color corresponding to another of the sensing electrodes 302), the local assembly feedback circuitry of the sensing electrode 302 may activate one or more local assembly feedback indicators, refrain from activating one or more local assembly feedback indicators, and/or modify an activated local assembly feedback indicator is incorrectly positioned.

FIGS. 11 and 12 illustrate examples of assembly verification sensors, but other types of sensors or combinations of sensors may be used. For instance, in embodiments, an assemblable element may include a radio frequency identification (RFID) reader configured to sense an RFID tag disposed on the garment 200. In embodiments, an assemblable element may include a magnetic sensor such as a Hall effect sensor or a reed switch configured to sense a magnet disposed on the garment 200. Such embodiments of assembly verification sensors may be implemented similarly to the NFC reader 401/NFC tag 420 and/or the photoelectric sensor 424/color tag 426 described above with reference to FIGS. 11 and 12, respectively. In embodiments, an assemblable element may include a combination of sensors, such as a Hall effect sensor and a photoelectric sensor.

In implementations, the local assembly feedback circuitry may include its own power source. For instance, the local assembly feedback circuitry may include a replaceable and/or a rechargeable battery (e.g., rechargeable by the patient 104 or other user removing the battery and placing it into a charger, or rechargeable by drawing power from the controller 400 once the connector 308 is inserted into the controller 400). Additionally or alternatively, in implementations, the local assembly feedback circuitry may be powered by the controller 400 (e.g., by the battery 908 discussed in FIG. 19, when the connector 308 is inserted into the controller 400). The power source of the local assembly feedback circuitry may affect the process by which the circuitry functions.

As an illustration, if the local assembly feedback circuitry includes its own power source, the local assembly feedback circuitry may determine whether to activate or modify one or more local assembly feedback indicators at the moment an assembly verification sensor senses an NFC tag, a color tag, an RFID tag, a magnet, etc. As another illustration, if the local assembly feedback circuitry includes its own power source, the local assembly feedback circuitry may determine whether to activate or modify one or more local assembly feedback indicators once the local assembly feedback circuitry has first determined that its respective assemblable element has been assembled. For instance, referring back to the example of an assemblable element being a sensing electrode 302, an outer surface of the sensing electrode 302 may include electrical contacts configured to mate with corresponding electrical contacts of an electrode fastener 212. Thus, assembling a sensing electrode 302 into an electrode fastener 212 may complete a circuit, which indicates to the local assembly feedback circuitry that the sensing electrode 302 has been assembled. The local assembly feedback circuitry may then use the assembly verification sensor of the sensing electrode 302 to identify whether the electrode fastener 212 includes the correct NFC tag, color tag, RFID tag, magnet, etc. for the sensing electrode 302. As another illustration, if the local assembly feedback circuitry is powered by the controller 400, the local assembly feedback circuitry may determine whether to activate or modify one or more local assembly feedback indicators once the connector 308 has been connected to the controller 400 and the local assembly feedback circuitry receives power from the controller 400.

Figure 21:
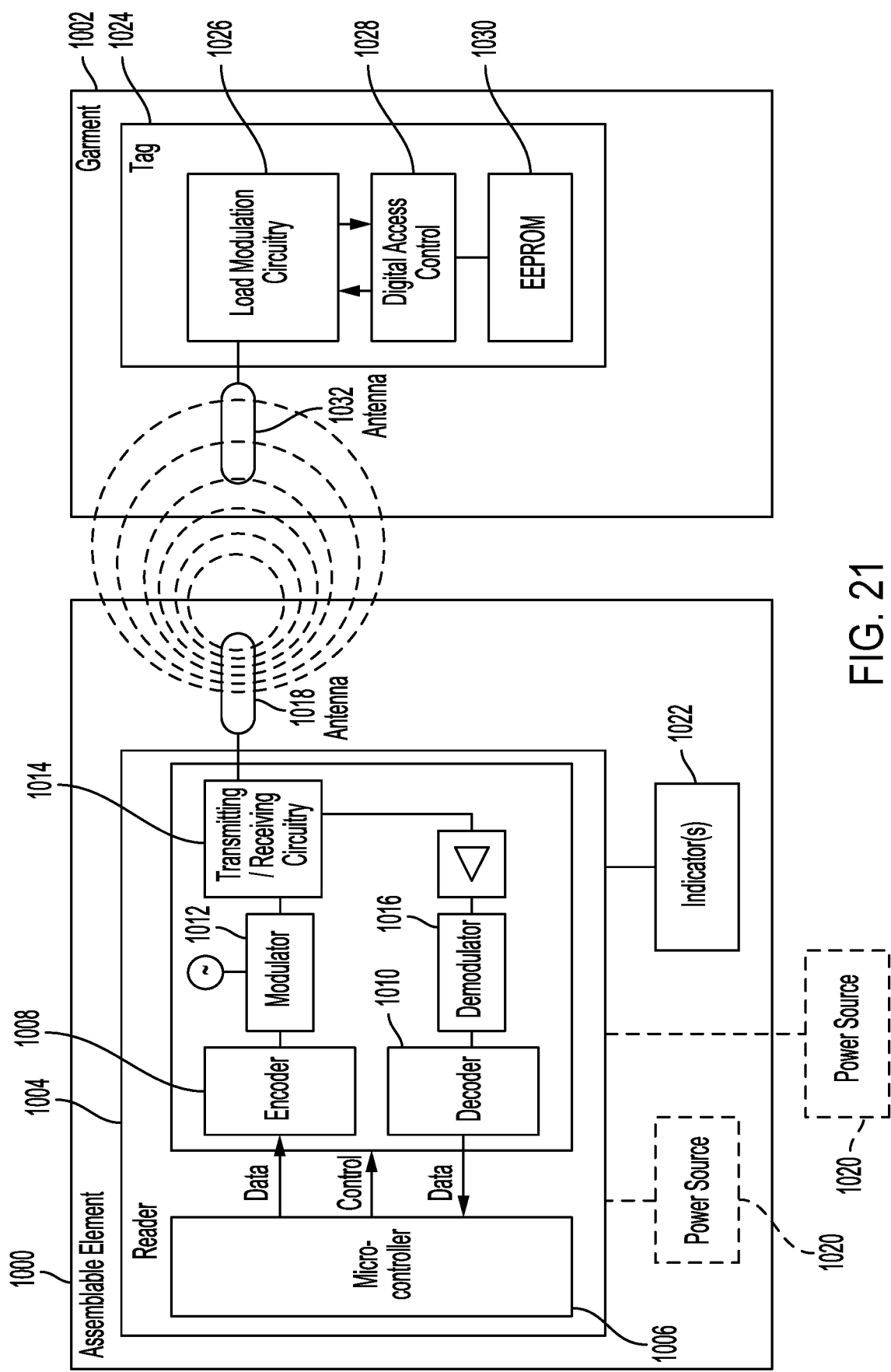
FIG. 21 depicts an example electronic architecture for circuitry used to determine correct assembly of an assemblable element using radio frequency.

FIG. 21 illustrates an electronic architecture for circuitry (e.g., part or all of the local assembly feedback circuitry) that uses radio frequency (RF) to determine whether the assemblable element has been correctly assembled into the garment. As such, implementations of local assembly feedback circuitry where the assembly verification sensor is an NFC sensor or an RF sensor may use the electronic architecture, or similar electronic architecture, as shown in FIG. 21. An assemblable element 1000 (e.g., implemented as part of the electrode belt 300, such as a sensing electrode 302, a therapeutic electrode 304, or the signal processing unit 310, or other assemblable unit such as a response button unit) may include a reader 1004, such as an NFC reader or an RF reader. The reader 1004 may include, for instance, a microcontroller 1006, an encoder 1008, a decoder 1010, a modulator 1012, transmitting/receiving circuitry 1014, and a demodulator 1016. As shown, the microcontroller 1006 may generally control operation of the reader 1004, communicating with the encoder 1008 and the decoder 1010 to encode signals transmitted from the reader 1004 and decode signals received at the reader 1004. The reader 1004 may transmit and receive these signals via the transmitting/receiving circuitry 1014 and an antenna 1018 in electronic communication with the reader 1004. In general, the signals transmitted by the reader 1004 may be an RF field. The RF field may be modulated by the modulator 1012 of the reader 1004.

In turn, the RF field may be sensed by a tag 1024 located in the garment 1002 (e.g., the garment 101, the garment 200) via an antenna 1032. The tag 1024 may include load modulation circuitry 1026 in communication with a digital access control 1028 and an electronically erasable programmable read-only memory (EEPROM) 1030. When the tag 1024 senses the RF field, the tag 1024 may draw power from the RF field for operation. The tag 2014 may further back scatter the RF field, causing the intensity of the RF field to vary, using load modulation (e.g., via the load modulation circuitry 1026). For example, the load modulation circuitry 1026 may include a resistor or capacitor configured to draw current from the antenna at a certain frequency or certain frequencies. The antenna 1018 of the reader 1004 then receives the modulated field, which the demodulator 1016 interprets as data. Based on the data from the demodulator 1016, the reader 1004 may determine whether the tag 1024 is the correct tag corresponding to the assemblable element 1000, meaning whether the assemblable element 1000 has been assembled into the correct location on the garment 1002. As an illustration, each tag 1024 may load modulate a received RF field in a unique way. As such, the reader 1004 may determine whether the load modulated RF field received at the antenna 1018 of the reader 1004 matches the way the RF field is expected to be load modulated by its corresponding tag 1024.

Depending on whether the reader 1004 determines that the tag 1024 corresponds to the assemblable element 1000, the reader 1004 may activate one or more local assembly feedback indicators 1022, as further described below with reference to FIGS. 13-18. Additionally, as also shown in FIG. 21, the reader 1004 may draw power from a power source 1020 located either in the assemblable element 1000 or outside of the assemblable element 1000 (e.g., as indicated by the dotted lines in FIG. 21), as discussed above.

Figure 22A:
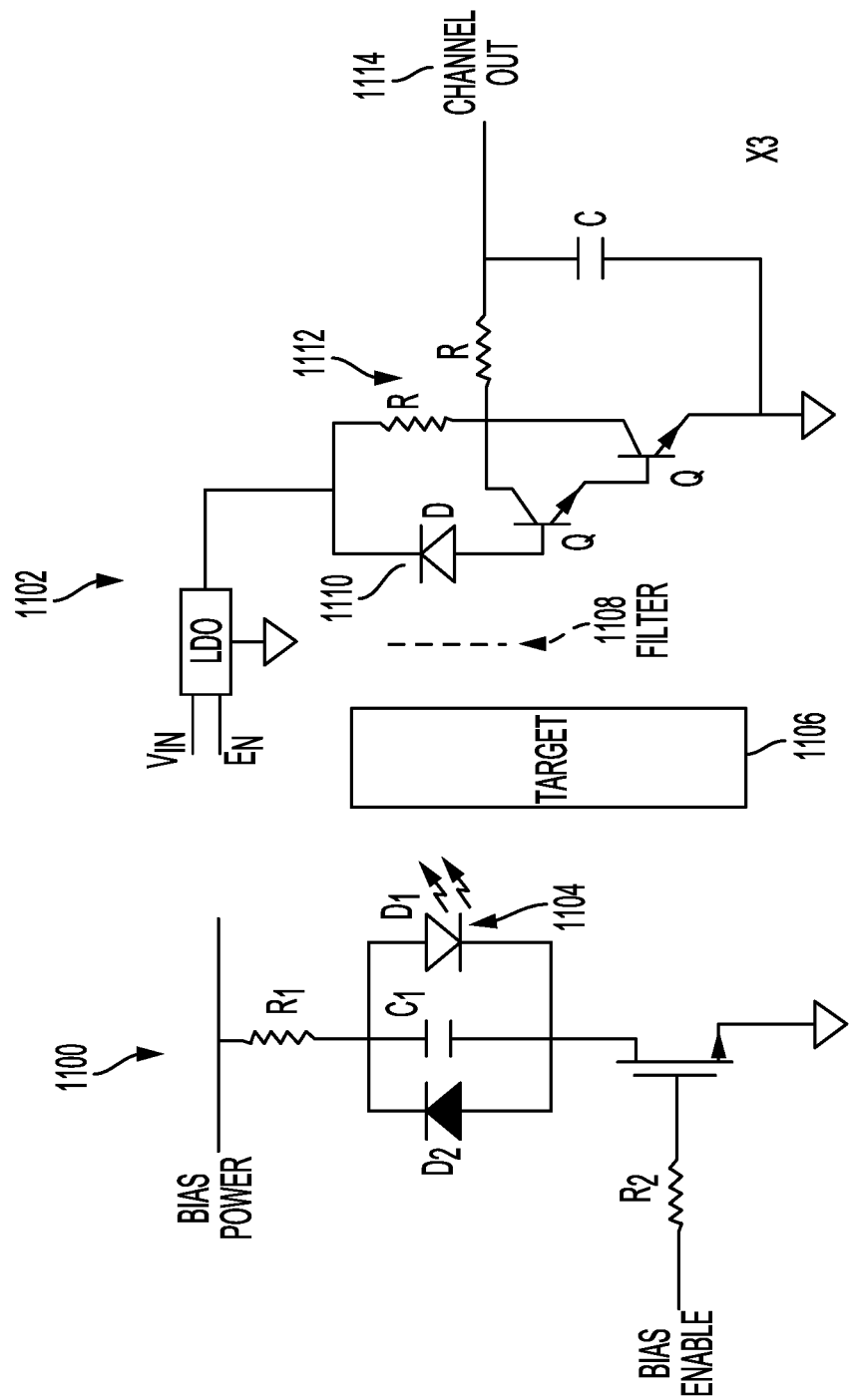
FIG. 22A depicts example circuitry that uses light to determine whether an assemblable element has been correctly assembled.

FIG. 22A illustrates example circuitry (e.g., implemented as part of local assembly feedback circuitry) that uses light to determine whether the assemblable element has been correctly assembled into the garment. The example circuitry of FIG. 22A includes a white light emitting portion 1100 and a light receiving portion 1102. The white light emitting portion 1100 configured to power a white light source 1104 (e.g., a white LED). The white light is directed to a target 1106, for example, the garment onto or into which the assemblable element has been assembled. As an illustration, the white light may be directed to a color tag on the garment at the assembly point, such as the color tag 426 shown in FIG. 12.

Once the white light source 1104 is activated, light that is reflected off of the target 1106 passes through a filter 1108 (e.g., an optical notch filter or optical band pass filter) and is sensed by a receiver 1110 (e.g., a phototransistor). In implementations, the receiver 1110 may also be provided with light shields to minimize false detections from stray ambient light. The signal from the receiver 1110 then passes through signal processing circuitry 1112 before being output at a channel out 1114. For example, as shown in FIG. 22A, the signal processing circuitry 1112 may including a Darlington pair transistor arrangement and an RC circuit. In implementations, local assembly verification circuitry may include multiple copies of the light receiving portion 1102, each configured to receive a different color of light (e.g., a different wavelength or range of wavelengths of light) via a different optical filter. As an illustration, the local assembly verification circuitry may include three copies of the light receiving portion: one for receiving red light, one for receiving green light, and one for receiving blue light. For instance, the light receiving portion 1102 for red light may include an optical band pass filter 1108 configured to pass light in a 650 to 750 nm range, the light receiving portion 1102 for green light may include an optical band pass filter 1108 configured to pass light in a 490 to 575 nm range, and the light receiving portion 1102 for blue light may include an optical band pass filter 1108 configured to pass light in a 420 nm to 490 nm range. However, in other implementations, the light receiving portion 1102 may be configured to filter for different and/or additional colors and wavelengths of light.

After the light receiving portions 1102 output the signals corresponding to the received light, the signals may undergo additional processing (e.g., run through an analogue-to-digital converter) and compared to color profiles to determine the color of the target 1106. The color profiles may be based on, e.g., the absolute intensity of each signal and/or the comparative intensity of each signal to each other. For instance, in the example of the local assembly verification circuitry including light receiving portions 1102 configured to output values for received red, green, and blue light, the circuitry may be further configured to convert the output values into RGB values. As an example, the output values may be calibrated to RGB values by testing the light receiving portions 1102 on color samples (e.g., white, black, red, green, and blue color samples). Then, when in use, the local assembly verification circuitry may take representative RGB values (e.g., average or median RGB values over a predetermined period of time) and compare the representative RGB values to RGB value profiles for different colors. The local assembly verification circuitry may identify the color of the target 1106 based on the representative RGB values matching an RGB value profile for the color (e.g., within a certain amount or percentage of error, such as 5%, 10%, 15%, etc.). Table 1 below illustrates example RGB values profiles for different colors.

TABLE 1

Example RGB Value Profiles for Colors

| Color | R Value | G Value | B value |
|---|---|---|---|
| White | 255 | 255 | 255 |
| Black | 0 | 0 | 0 |
| Brown | 128 | 64 | 0 |
| Red | 255 | 0 | 0 |
| Orange | 255 | 128 | 0 |
| Yellow | 255 | 255 | 0 |
| Green | 0 | 255 | 0 |
| Teal | 0 | 255 | 255 |
| Blue | 0 | 0 | 255 |
| Purple | 128 | 0 | 128 |

Figure 22B:
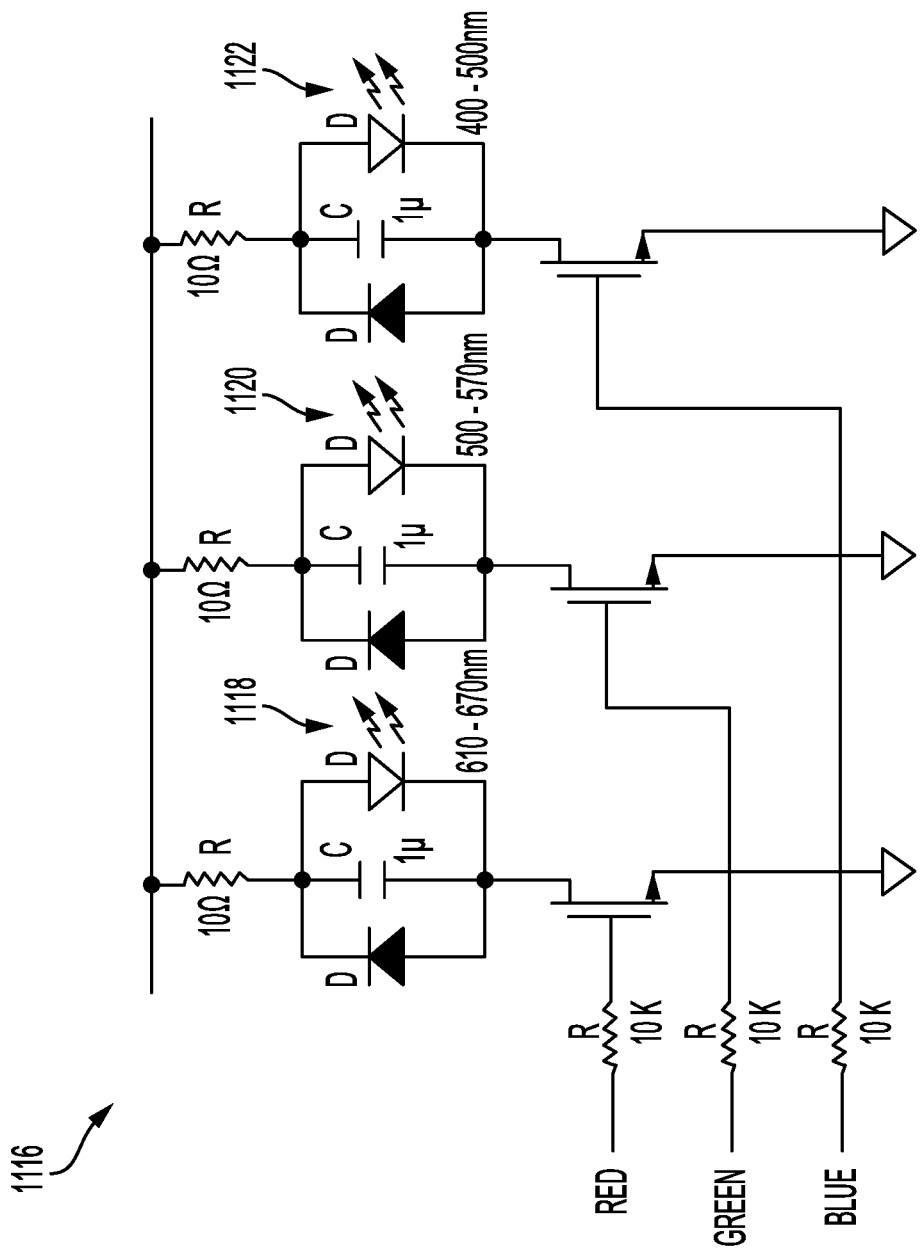
FIG. 22B depicts another example of circuitry that uses light to determine whether an assemblable element has been correctly assembled.

In implementations of local assembly verification circuitry including a light sensor, instead of including a white light emitting portion 1100, the local assembly verification circuitry may include a colored light emitting portion 1116, for example, as shown in FIG. 22B. In the example illustrated in FIG. 22B, the colored light emitting portion 1116 is configured to emit red, green, and blue light via a red light source 1118 (e.g., a red LED), a green light source 1120 (e.g., a green LED), and a blue light source 1122 (e.g., a blue LED). For instance, the red light source 1118 may be configured to emit light in a 610-670 nm range, the green light source 1120 may be configured to emit light in a 500-570 nm range, and the blue light source 1122 may be configured to emit light in a 400-500 nm range. In implementations including the colored light emitting portion 1116, the colored light emitting portion 1116 may be configured to emit each of the light sources 1118, 1120, and 1122 in sequence (e.g., for a predetermined amount of time), and the local assembly verification circuitry may include one copy of the light receiving portion 1102 that outputs a signal for each of the light sources 1118, 1120, 1122. The local assembly feedback circuitry may then use the output signals for the light received back from the target 1106 to determine the color of the target, for example, as described above.

Figure 22C:
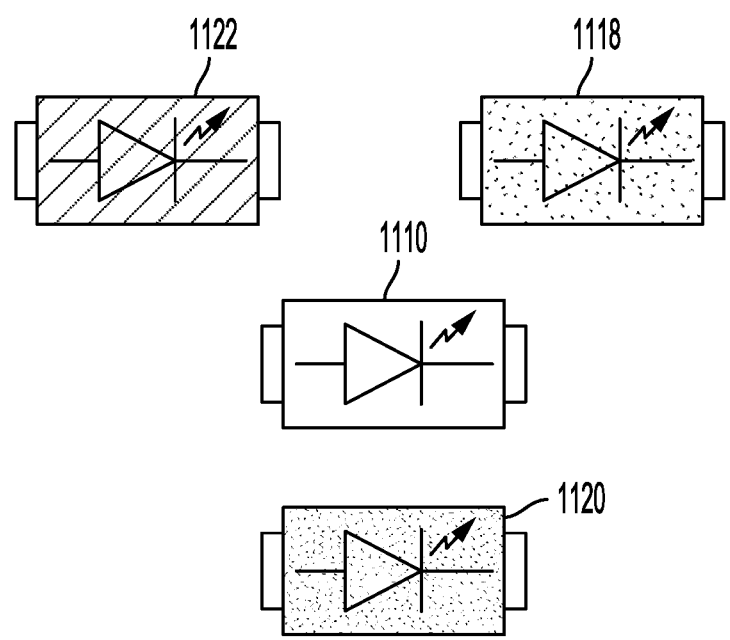
FIG. 22C depicts an example arrangement of light sources and a light receiver.

An illustration of an arrangement of the red light source 1118, the green light source 1120, and the blue light source 1122 of the colored light emitting portion 1116 around the receiver 1110 of the light receiving portion 1102 is shown in FIG. 22C. For example, as illustrated, the red light source 1118, the green light source 1120, and the blue light source 1122 may be spaced equidistantly from each other and from the receiver 1110. However, in other implementations, the colored light emitting portion 1116 may include additional and/or different light sources from the examples shown in FIGS. 22B and 22C.

Figure 23:
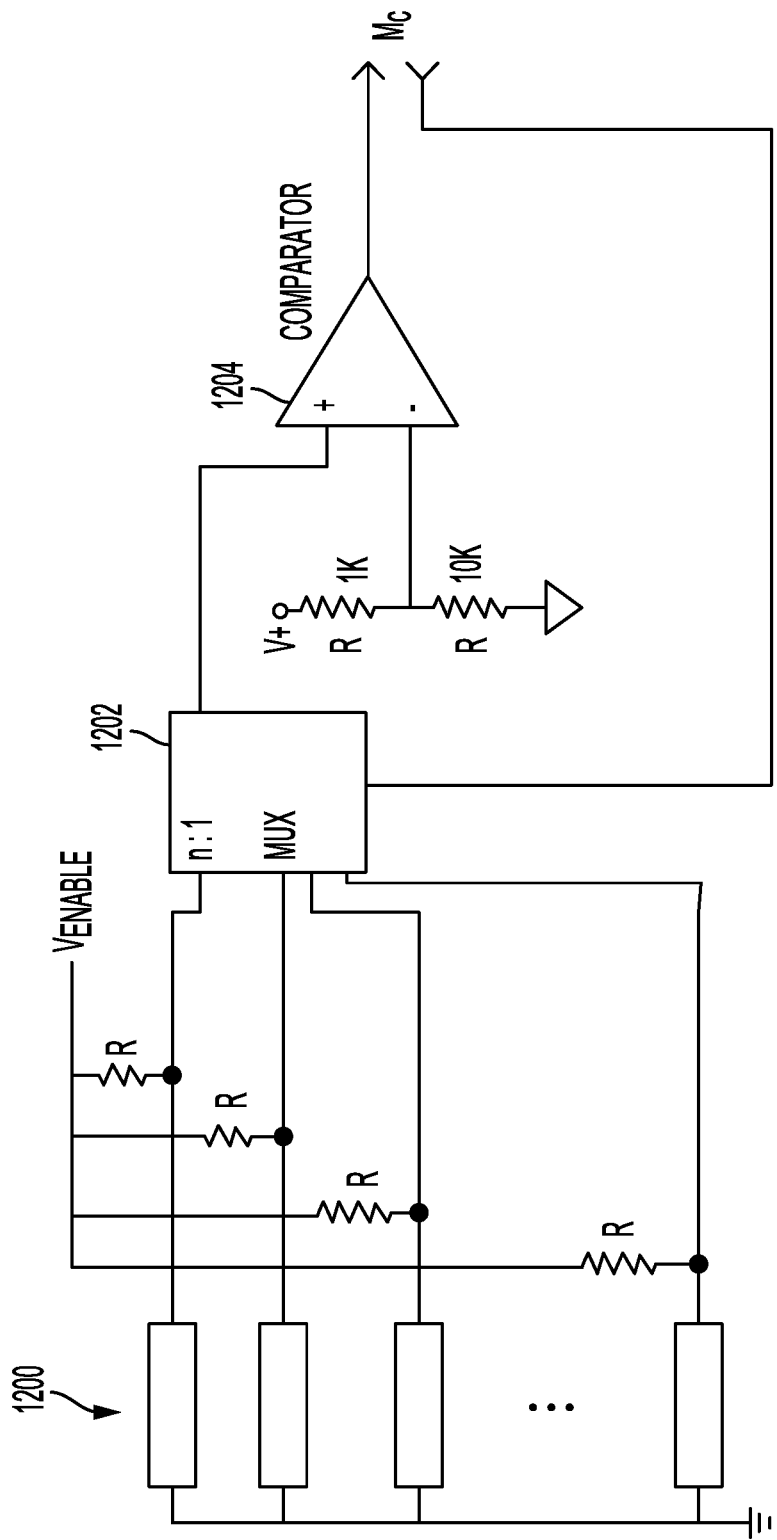
FIG. 23 depicts example circuitry that uses magnetic fields to determine whether an assemblable element has been correctly assembled.

FIG. 23 illustrates example circuitry (e.g., implemented as part of local assembly feedback circuitry) that uses magnetic fields to determine whether the assemblable element has been correctly assembled into the garment. The example circuitry of FIG. 23 includes a series of magnetic sensors 1200, such as reed switches and/or Hall effect sensors, configured in an arrangement to sense magnets located in the garment at the point where the assemblable element is to be assembled (e.g., with another strong magnet located in the center of the assemblable element and in the center of the assembly location to help orient the assemblable element). When brought into proximity with a magnet, the magnetic field grounds out the magnetic sensor 1200, which is sensed by a multiplexor 1202. The output of the multiplexor 1202 is input into a comparator 1204, and the output of the comparator 1204 in turn is used to determine whether the assemblable element has been properly assembled.

For instance, the correct assembly location for each assemblable element may include magnets in a unique different configuration that correspond to a matching unique configuration of the magnetic sensors 1200 on the assemblable element. As such, if the assemblable element is assembled into a location other than the correct assembly location, some or all of the magnetic sensors 1200 may remain un-grounded out, which in turn will cause the output of the comparator 1204 to be zero. The local assembly feedback circuitry may then determine from the zero output that the assemblable element has been assembled into the incorrect location. If the assemblable element is instead assembled correctly, all of the magnetic sensors 1200 may be grounded out, which will create a non-zero output at the comparator 1204. Based on the non-zero output, the local assembly feedback circuitry may then determine that the assemblable element has been correctly assembled.

As another example, the correct assembly location for each assemblable element may include a unique number of magnets, which may be sensed by the magnetic sensors 1200 arranged in a spaced configuration (e.g., in a ring) on the assemblable element. Each assemblable element may be associated with a unique voltage that may be generated by the magnets of the correct assembly location grounding out the magnetic sensors 1200. If the output of the multiplexor 1202 is the expected voltage (e.g., as determined at the comparator 1204, or elsewhere in the local assembly feedback circuitry from the output of the multiplexor 1202 if the comparator 1204 is not included), the local assembly feedback circuitry may determine that the assemblable element has been correctly assembled into the garment. Otherwise, the local assembly feedback circuitry may determine that the assemblable element has been incorrectly assembled.

Figure 24:
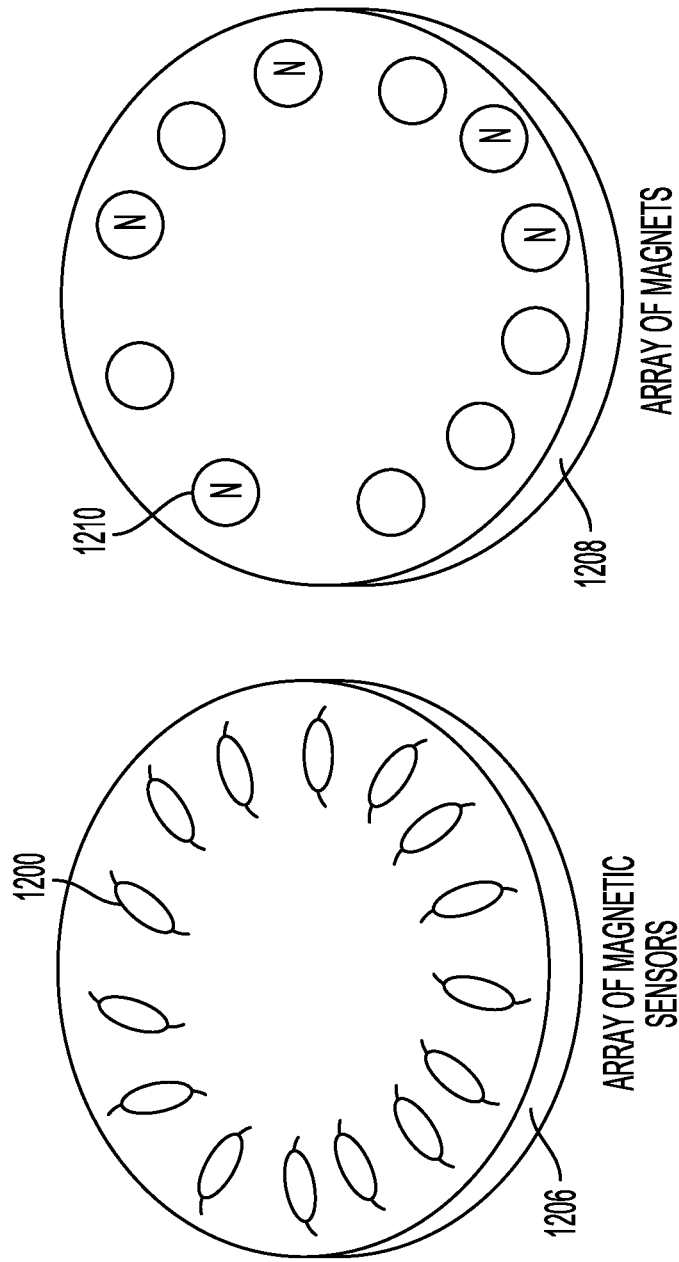
FIG. 24 depicts an example of an assemblable element and an assembly location.

FIG. 24 illustrates an example of an assemblable element 1206 with an array of the magnetic sensors 1200 arranged around the rim of the assemblable element 1206. The magnetic sensors 1200 are configured to sense magnets 1210 arranged on an assembly location 1208 for the assemblable element 1206. As discussed above, the local assembly verification circuitry of the assemblable element 1206 may be able to determine whether the assemblable element 1206 has been assembled correctly based on the assemblable element sensing the correct number and/or arrangement of magnets 1210 at the assembly location 1208. Alternatively, or additionally, each assembly location 1208 may include the same number of magnets 1210, but the magnets 1210 may be oriented with a unique polarity arrangement for the corresponding assemblable element 1206 to sense (e.g., if the magnetic sensors 1200 are Hall effect sensors). For instance, as shown in FIG. 24, the unique polarity arrangement is having four of the magnets 1210 oriented with their north poles facing towards the assemblable element 1206.

Figure 25:
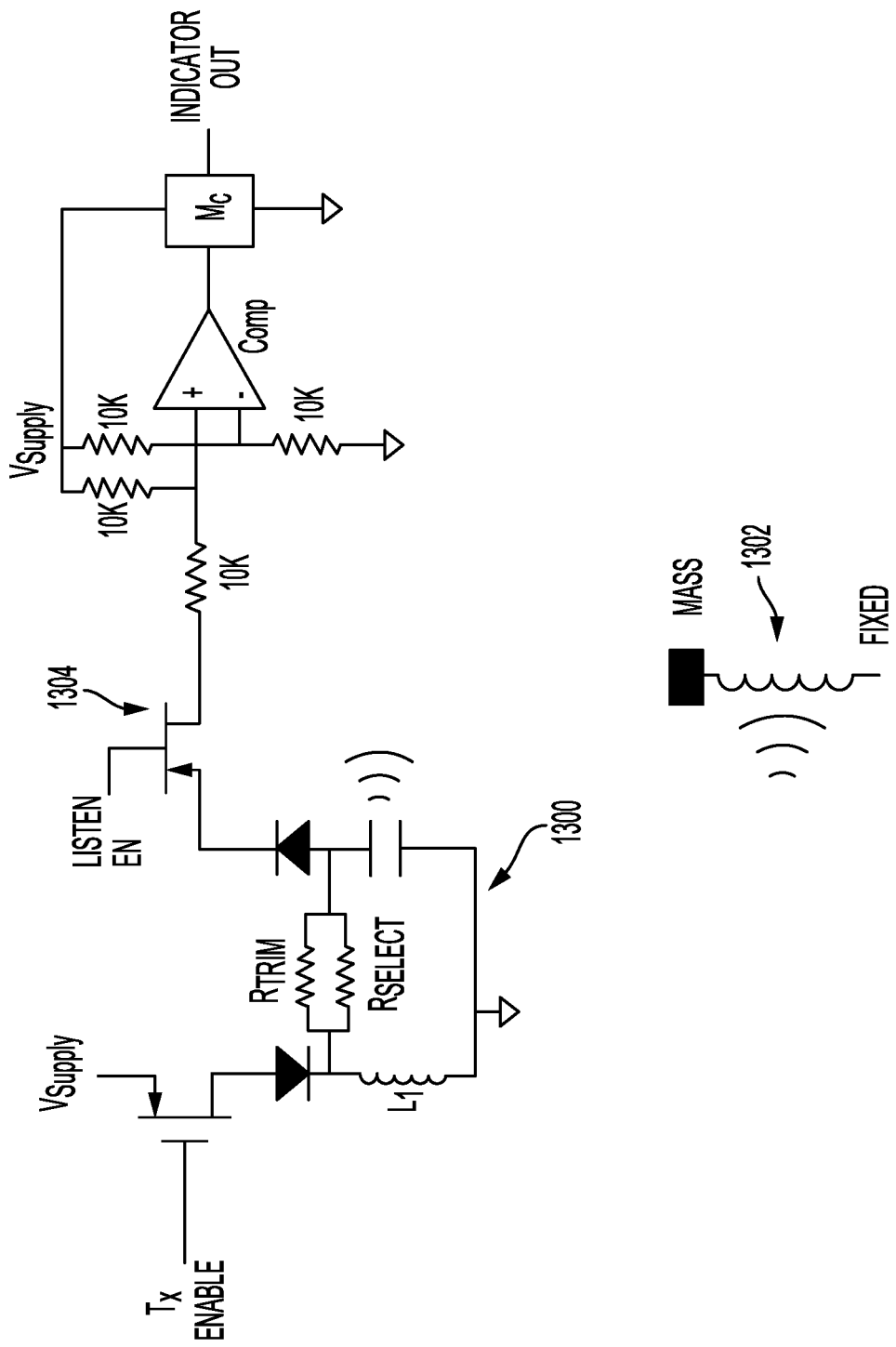
FIG. 25 depicts example circuitry that uses vibrations to determine whether an assemblable element has been correctly assembled.

FIG. 25 illustrates example circuitry (e.g., implemented as part of local assembly feedback circuitry) that uses vibrations to determine whether the assemblable element has been correctly assembled into the garment. The example circuitry of FIG. 25 includes a vibrator portion 1300 configured to emit vibrations at a predetermined frequency (e.g., based on the values of $R_{trim}$ and $R_{select}$). The vibrations may be picked up by a spring 1302 in the assembly location. The spring 1302 may be configured with a resonant frequency that matches the predetermined frequency of the vibrator portion 1300 of the correct, paired assemblable element. Thus, if the correct assemblable element is assembled at the assembly location, and the vibrator portion 1300 is activated, the spring 1302 may move at its resonant frequency. In other implementations, the spring 1302 could be replaced by, for example, a spinning disc or trimmed flap. When the vibrator portion 1300 is deactivated, the continued movement of the spring 1302 may be sensed by a sensing portion 1304 (e.g., including an accelerometer) in the local assembly feedback circuitry to determine that the assemblable element has been assembled at the correct location. However, if the incorrect assemblable element is assembled at the assembly location, the vibrations of the vibrator portion 1300 will not be at the resonant frequency of the spring 1302, and the sensing portion 1304 will not be able to sense the movement of the spring 1302 after the vibrator portion 1300 is deactivated. As such, the local assembly feedback circuitry would use the lack of movement to determine that the assemblable element was assembled at the incorrect assembly location.

Similar principles could be used in other implementations. For instance, instead of using vibrations, the local assembly feedback circuitry could emit sounds or ultrasounds. The assembly location could include resonance cavities, and whether the correct resonance occurred at the assembly location could be determined by a microphone or accelerometer in the assemblable element. As another example, the local assembly feedback circuitry could emit a single frequency RF pulse, and the assembly location could include tuned resonance structures or circuits. Whether these tuned resonance structures or circuits are activated could be picked up via an antenna in the assemblable element.

In implementations, as part of determining whether an assemblable element has been correctly assembled (e.g., in addition to determining whether an assemblable element has been assembled at the right location), the local assembly verification circuitry may use the assembly verification sensor to determine whether the assemblable element has been assembled correctly at and/or into the right location. For instance, the assembly verification sensor may only sense a tag in the garment 200 (e.g., the NFC tag 420 of FIG. 11, the color tag 426 of FIG. 12) when the assemblable element has been assembled correctly at the assembly location. To illustrate, referring to FIG. 12, the photoelectric sensor 424 of a sensing electrode 302 may only be able to sense the color tag 426 located at the electrode fastener 212 when the sensing electrode 302 is correctly assembled into the electrode fastener 212. Otherwise, the color tag 426 may not be able to be sensed (e.g., because the aperture in the hook-and-loop fabric 422 down to the color tag 426 is covered up when the sensing electrode 302 is incorrectly assembled).

Figure 13:
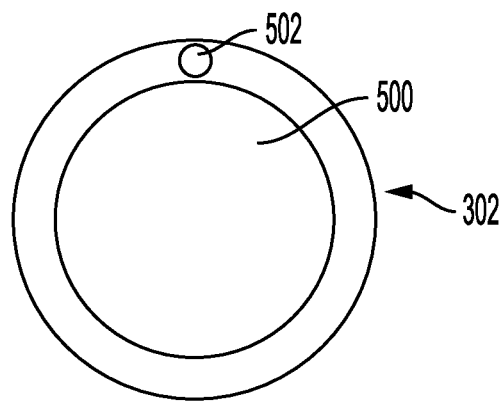
FIG. 13 depicts an example of a local assembly feedback indicator.

An assemblable element of the electrode belt 300 may include various types and/or combinations of local assembly feedback indicators configured to provide the human-discernable feedback alert indicating whether the respective assemblable element is incorrectly assembled into the garment 200. FIGS. 13-18 illustrate examples of various local assembly feedback indicators. Again using a sensing electrode 302 as an example, FIG. 13 shows one instance of a local assembly feedback indicator implemented as a visual indicator 502 provided between the sensing surface 500 of the sensing electrode 302 and the edge of the sensing electrode 302. For instance, the visual indicator 502 may be an LED configured to light up to provide the human-discernable feedback alert indicating whether the sensing electrode 302 is incorrectly assembled into the garment.

In implementations, the visual indicator 502 may be configured to light up when the sensing electrode 302 has been incorrectly assembled into the garment 200 (e.g., attached to the wrong electrode fastener 212). In implementations, the visual indicator 502 may be configured to light up when the sensing electrode 302 has been correctly assembled into the garment 200 (e.g., attached to the right electrode fastener 212). In implementations, the visual indicator 502 may be configured to switch between settings. As an example, the visual indicator 502 may be configured to light up in a first color to indicate that the sensing electrode 302 has been incorrectly assembled into the garment 200 and configured to light up in a second color to indicate that the sensing electrode 302 has been correctly assembled into the garment. As another example, the visual indicator 502 may also be configured to light up in a third color to indicate that the sensing electrode 302 is still in the process of being assembled (e.g., has not been attached to any electrode fastener 212 such that the assembly verification sensor does not currently sense an NFC tag, color tag, RFID tag, magnet, etc.). In implementations, the assemblable element may include more than one visual indicator 502. For instance, an assemblable element may include a first colored indicator (e.g., a green LED) configured to light up when the respective assemblable element is correctly assembled into the garment 200 and a second colored indicator (e.g., a red LED) configured to light up when the respective assemblable element is incorrectly assembled into the garment 200.

In implementations, the visual indicator 502 may light in patterns to indicate whether the sensing electrode 302 has been incorrectly assembled into the garment 200. For example, once the local assembly feedback circuitry has determined that someone is attempting to assemble the electrode belt 300 into the garment 200 (e.g., by determining that the connector 308 has been plugged into the controller 400), the visual indicator 502 may flash on and off until the sensing electrode 302 has been correctly assembled into the garment 200. Once the sensing electrode 302 has been correctly assembled, the visual indicator 502 may stay on. As another example, the visual indicator may flash on and off when the sensing electrode has been attached to the incorrect electrode fastener 212 and may remain on when the sensing electrode has been attached to the correct electrode fastener 212.

Figure 14:
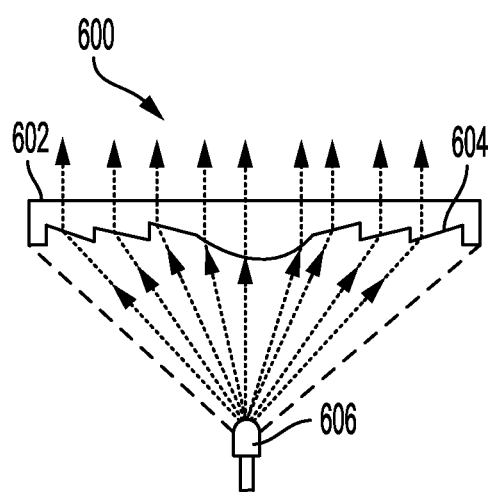
FIG. 14 depicts an example of a local assembly feedback indicator.

A visual indicator may also be implemented in other configurations aside from, for example, the location on a sensing electrode 302 shown in FIG. 13. For instance, FIG. 14 illustrates another example of a visual indicator implementation. An assemblable element may include a clear plastic housing 600 with an outer surface 602 and an inner surface 604. As shown, the outer surface 602 may be flat, but the inner surface 604 may be configured as a Fresnel-type spreader such that light provided by a light source 606 (e.g., LED) inside of the assemblable element is refracted towards a viewer across the outer surface 602. This implementation could provide a "halo" around the assemblable element when the light source 606 is activated to alert the patient 104 or other user whether the assemblable element has been correctly assembled.

Figure 15:
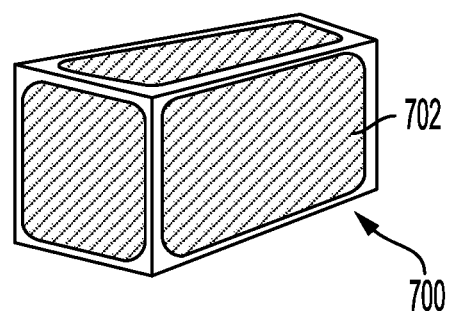
FIG. 15 depicts an example of a local assembly feedback indicator.

FIG. 15 illustrates another example visual indicator implementation. An assemblable element may have a completely clear outer shell 700 designed with light spreaders and pipes. A dark epoxy filling 702 of the cavity of the outer shell 700 would allow the assemblable element in normal use to appear dark. When a light source provided in the clear outer shell 700 is activated to alert the patient 104 or other user whether the assemblable element has been correctly assembled, however, the clear outer shell 700 would shine to provide the human-discernable feedback alert.

Figure 16:
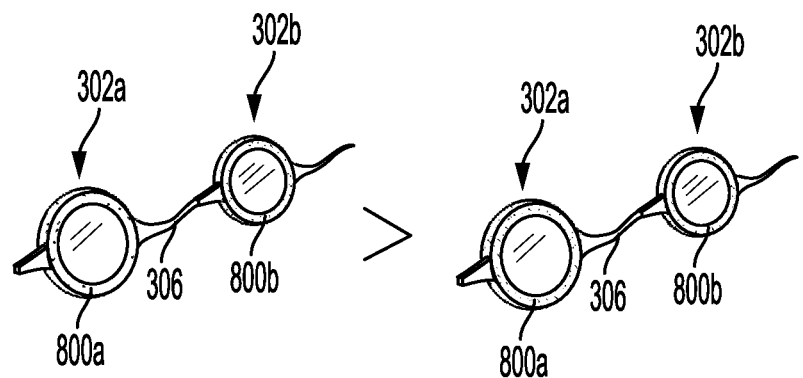
FIG. 16 depicts an example of a local assembly feedback indicator.

FIG. 16 illustrates another example visual indicator implementation (e.g., in sensing electrodes 302), including color as part of the visual indicator. As shown in FIG. 16, sensing electrodes 302*a* and 302*b* connected by the wires 306 may include a visual indicator 800*a* and 800*b*, respectively, incorporated as part of the housing of the electrodes 302*a* and 302*b*. In the example of FIG. 16, the sensing electrode 302*b* is assembled correctly, and thus its visual indicator 800*b* is lit in a first color indicating the correct assembly (e.g., green or blue). However, the sensing electrode 302*a* is assembled incorrectly, and its visual indicator 800*a* is lit in a second color indicating the incorrect assembly (e.g., red or yellow). Once the sensing electrode 302*a* is moved to the correct assembly location, however, the visual indicator 800*a* of the sensing electrode 302*a* changes to be lit in the first color.

Figure 17:
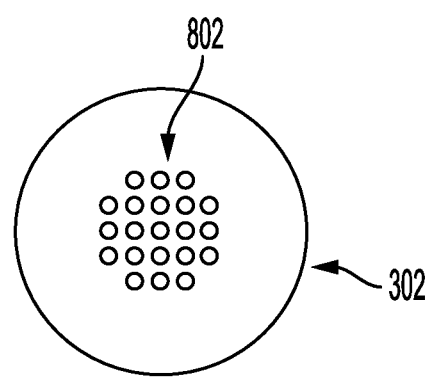
FIG. 17 depicts an example of a local assembly feedback indicator.

FIG. 17 shows another example of a local assembly feedback indicator, again using a sensing electrode 302 as an example. In FIG. 17, the local assembly feedback indicator is implemented as an auditory indicator 802 (e.g., provided on a back surface of the sensing electrode 302, opposite from the sensing electrode surface configured to contact the patient's skin). For instance, the auditory indicator 802 may be a speaker configured to emit a sound to provide the human-discernable feedback alert indicating whether the sensing electrode 302 is incorrectly assembled into the garment 200.

In implementations, the auditory indicator 802 may emit a sound indicating whether the sensing electrode 302 has been incorrectly assembled into the garment 200. For example, the auditory indicator 802 may emit an instruction telling the patient 104 or other user assembling the electrode belt 300 into the garment 200 that the sensing electrode 302 is assembled at the incorrect electrode fastener 212 and/or explaining which electrode fastener 212 the sensing electrode 302 should be assembled into (e.g., "Move the electrode to the fastener to the right." or "Please check the green electrode."). As another example, the auditory indicator 802 may emit an unpleasant noise, such as a buzzer sound, to indicate that the sensing electrode 302 has been incorrectly assembled into the garment 200. As another example, the auditory indicator 802 may emit a sound, such as a beeping sound, beginning once the patient 104 or other user begins assembly of the electrode belt 300 into the garment 200 and ending once the assemblable element is correctly assembled into the garment 200. In implementations, the auditory indicator 802 may emit a sound indicating that the sensing electrode 302 has been correctly assembled into the garment 200. As an example, the auditory indicator 802 may emit a pleasant noise, such as a chime, to indicate that the sensing electrode 302 has been assembled into the correct location on the garment 200. As another example, the auditory indicator 802 may emit feedback indicating that the sensing electrode 302 has been correctly assembled (e.g., "Good job. This electrode is in the right location."). As another example, the auditory indicator 802 may emit tone frequencies on a chromatic scale to provide feedback. For example, the auditory indicator 802 may emit three ascending and/or major scale notes to indicate correct assembly and three descending and/or discordant notes to indicate incorrect assembly.

Figure 18:
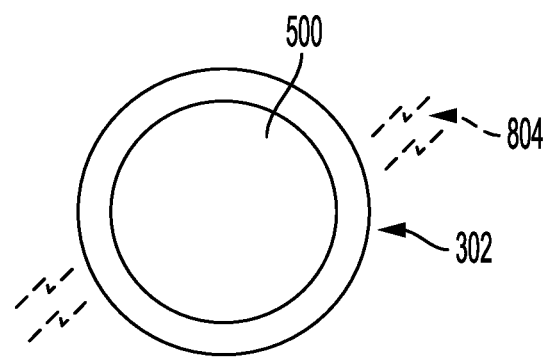
FIG. 18 depicts an example of a local assembly feedback indicator.

Once more using a sensing electrode 302 as an illustration, FIG. 18 shows another example of a local assembly feedback indicator. In FIG. 18, the local assembly feedback indicator is implemented as a tactile or haptic indicator (not shown). For example, the tactile indicator may be provided within a housing of the sensing electrode 302. The tactile indicator may be, for instance, a buzzer configured to vibrate or buzz to provide the human-discernable feedback alert indicating that the sensing electrode 302 is incorrectly assembled into the garment 200, as illustrated by vibration lines 804 in FIG. 18.

As an example of an auditory and/or tactile indicator, vibration and/or noise can be achieved with a piezoelectric transducer. One driving circuitry can apply high amplitude, low frequency (e.g., 40 Hz) with wave shapes optimized for maximal vibration. The same piezoelectric transducer can also be driven with higher frequency signals to produce chirps and tones (e.g., 400-4000 Hz). This has the advantage of being small, light, and effective. As another example, if higher vibration is required, a pager motor or similar could be used.

In implementations, the tactile indicator may vibrate indicating whether the sensing electrode 302 has been incorrectly assembled into the garment 200. For example, the tactile indicator may continuously vibrate to indicate that the sensing electrode 302 is incorrectly assembled into the garment 200. As another example, the tactile indicator may vibrate at a first frequency if the local assembly feedback circuitry determines that the patient 104 or other user is assembling the electrode belt 300 into the garment 200 (e.g., based on the connector 308 being plugged into the controller 400) and may vibrate at a second frequency if the sensing electrode 302 is incorrectly assembled into the garment 200. For instance, the tactile indicator may vibrate periodically if the sensing electrode 302 is still being assembled into the garment 200 and vibrate continuously if the sensing electrode 302 is incorrectly assembled into the garment 200. As another example, the tactile indicator may vibrate at a first frequency if the sensing electrode 302 is incorrectly assembled into the garment 200 and vibrate at a second frequency if the sensing electrode 302 is correctly assembled into the garment. To illustrate, the tactile indicator may vibrate periodically if the sensing electrode 302 is incorrectly assembled into the garment 200. The tactile indicator may emit a strong double buzz if the sensing electrode 302 is correctly assembled into the garment 200. As another example, the tactile indicator may vibrate at a first strength if the sensing electrode 302 is still being assembled into the garment 200 and vibrate at a second strength if the sensing electrode 302 is incorrectly assembled into the garment 200. For instance, the tactile indicator may vibrate periodically at a first strength if the sensing electrode 302 is being assembled into the garment 200 and vibrate periodically at a second strength (e.g., at the same or a different frequency) if the sensing electrode 302 is incorrectly assembled into the garment 200.

In implementations, one or more of the assemblable elements may include local position feedback circuitry used to determine whether the respective assemblable element is being maintained in the correct position to ensure functioning or optimal function of the wearable cardiac device during wear and use. The local position feedback circuitry may be configured similarly to the local assembly feedback circuitry discussed above, or the local position feedback circuitry may be or be incorporated as part of the local assembly feedback circuitry discussed above. Accordingly, the local position feedback circuitry includes a position verification sensor configured to sense whether the respective assemblable element is in a predetermined position while the patient 104 is wearing the wearable cardiac device. The local position feedback circuitry also includes one or more local position feedback indicators locally disposed on the respective assemblable element and configured to provide a human-discernable feedback alert indicating whether the respective assemblable element is incorrectly positioned within the garment 200.

As an example use case, the assemblable elements may include the sensing electrodes 302 and/or therapeutic electrodes 304, which may become displaced from predetermined positions while the garment 200 is being worn by the patient 104. For instance, the band 204 containing the assembled sensing electrodes 302 of the electrode belt 300 may flip over such that the sensing electrodes 302 are no longer being worn against the patient's skin and the controller 400 cannot generate ECG signals or ECG signals of good quality for the patient 104. Thus, the predetermined position for an assemblable element may include a predetermined location and/or orientation for the assemblable element.

For example, in implementations, the position verification sensor of local position feedback circuitry may be or include an accelerometer. The accelerometer may be configured to sense an orientation of the assemblable element and output an accelerometer signal indicative of the orientation of the assemblable element. The local position feedback circuitry may thus use the accelerometer signal to determine whether the assemblable element is in the predetermined position (e.g., whether the assemblable element is in the predetermined orientation). As another example, the position verification sensor may be or include a pressure sensor. The pressure sensor may be configured to output a pressure signal indicative of the pressure being placed onto the pressure sensor. The local position feedback circuitry may thus use the pressure signal to determine whether the assemblable element is in the correct position (e.g., whether a pressure within predetermined parameters, such as between 0.25 and 0.62 psi as discussed above, is being applied on the assemblable element).

Other position verification sensors may additionally or alternatively be used, however, and may also be used to verify that an assemblable element is in the predetermined position before wear. For example, position verification sensors similar to the assembly verification sensors described above with reference to FIGS. 11 and 12 may be used in the wearable cardiac device, such as to determine whether an assemblable element has been inserted backwards into the garment 200 and/or has become flipped to a backwards orientation in the garment 200. To illustrate, an assembly verification sensor may determine whether a therapeutic electrode 304 has been correctly inserted into the garment 200 with the electrode surface facing the patient's skin or whether the therapeutic electrode 304 has been incorrectly inserted into the garment 200 with the electrode surface facing away from the patient 104.

In implementations, the local position feedback indicators may be configured similarly to the local assembly feedback indicators discussed above. For example, the local position feedback indicators may include one or more visual indicators, one or more auditory indicators, and/or one or more tactile indicators similarly to the indicators discussed with reference to FIGS. 13-18. As an illustration, the one or more local position feedback indicators may include a speaker configured to emit a sound to provide the human-discernable feedback alert indicating whether the respective assemblable element is incorrectly positioned (e.g., within the garment 200, with respect to the patient's anatomy, etc.). As another illustration, the one or more local position feedback indicators may include a buzzer or tactile indicator configured to vibrate to provide the human-discernable feedback alert indicating whether the respective assemblable element is incorrectly positioned (e.g., within the garment 200, with respect to the patient's anatomy, etc.).

For example, an auditory indicator may emit a sound when the respective assemblable element has been displaced from its predetermined position. In implementations, the sound may be a non-vocal alarm (e.g., a chime, a gong, etc.) to alert the patient 104 that the assemblable element has been displaced. In implementations, the sound may be a vocal alarm alerting the patient 104 that the assemblable element has been displaced (e.g., "The rightmost sensing electrode is out of place. Please restore the sensing electrode as soon as possible."). In implementations, the sound may be a voice instruction explaining to the patient 104 how to reconfigure the wearable cardiac device to restore the assemblable element to its predetermined position (e.g., "Please flip the left center electrode over as soon as possible"). In implementations, the sound may be a combination of these examples.

As another example, a tactile indicator may emit a tactile alert when the respective assemblable element has been displaced from its predetermined position. In implementations, the tactile indicator may vibrate or buzz continuously if local position feedback circuitry determines that the respective assemblable element is no longer in the predetermined position. In implementations, the tactile indicator may vibrate at a first frequency and/or strength if the local position feedback circuitry determines that the respective assemblable element is at a first deviation from the predetermined position, and may vibrate at a second frequency and/or strength if the local position feedback circuitry determines that the respective assemblable element is at a second deviation from the predetermined position. For instance, the tactile indicator may vibrate periodically if the local position feedback circuitry determines that the assemblable element is at the first deviation point or range (e.g., if the accelerometer signal shows that the assemblable element is at a 45 to 120 degree deviation from the predetermined orientation). The tactile indicator may then vibrate continuously if the local position feedback circuitry determines that the assemblable element as at the second deviation point or range (e.g., if the accelerometer signal shows that the assemblable element is at more than a 120 degree deviation from the predetermined orientation).

In implementations, some assemblable elements of a wearable cardiac device may be configured with local assembly feedback and/or local position feedback circuitry.

In implementations, all assemblable elements of a wearable cardiac device may be configured with local assembly feedback and/or local position feedback circuitry. For example, a wearable cardiac device may include sensing electrodes (e.g., sensing electrodes 302), therapy electrodes (e.g., therapy electrodes 304), a signal processing unit (e.g., signal processing unit 310), and a response button unit (e.g., response button unit 260) that are all configured as assemblable elements to be assembled into a garment (e.g., garment 200). Each of the sensing electrodes, therapy electrodes, signal processing unit, and response button unit may include local assembly feedback circuitry, including one or more local assembly feedback indicators, configured to provide feedback to the patient 104 or other user assembling the wearable cardiac device before use. To illustrate, each of the sensing electrodes, therapy electrodes, signal processing unit, and response button unit may include a red LED configured to light up when the respective assemblable element is incorrectly assembled into the garment and a green LED configured to light up when the respective assemblable element is correctly assembled into the garment.

Figure 19:
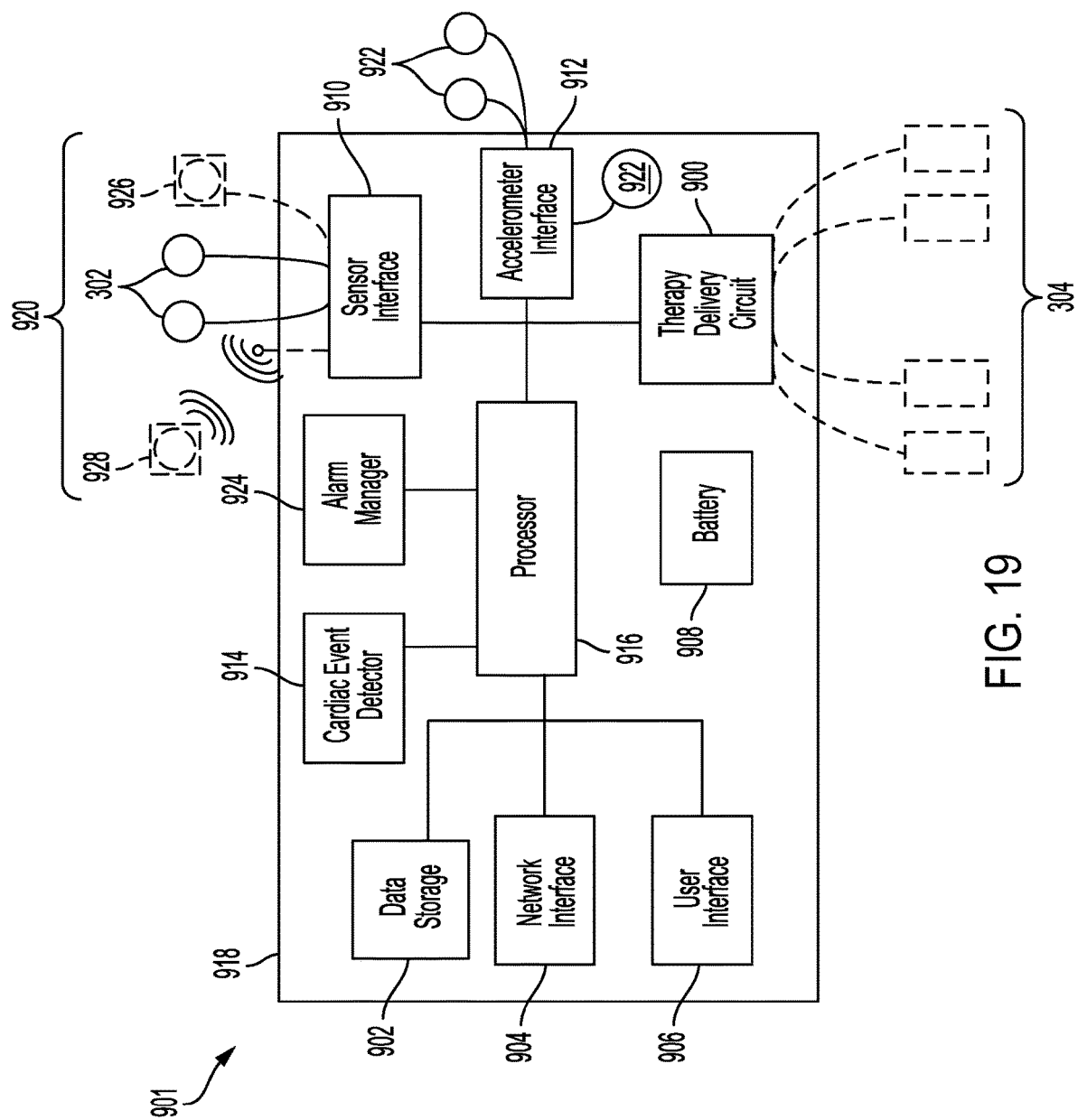
FIG. 19 depicts an example electronic architecture for a wearable defibrillator.

Returning to the controller of the wearable cardiac device, FIG. 19 illustrates a sample component-level view of a cardiac controller 901. The cardiac controller 901 is an example of the controller 400 shown in FIG. 4 and described above, though a similar configuration could also be used for the cardiac controller 106 shown in FIG. 1 and described above. As shown in FIG. 19, the cardiac controller 901 can include a housing 918 configured to house a therapy delivery circuit 900 configured to provide one or more therapeutic shocks to the patient 104 via the therapeutic electrodes 304, a data storage 902, a network interface 904, a user interface 906, at least one battery 908 (e.g., within a battery chamber configured for such purpose), a sensor interface 910 (e.g., to interface with one or more sensors, such as one or more assemblable elements including the ECG sensing electrodes 302 and other physiological sensors or detectors such as vibrational sensors, lung fluid sensors, infrared and near-infrared-based pulse oxygen sensors, and blood pressure sensors, among others), a cardiac event detector 914, an alarm manager 924, and at least one processor 916. In some implementations, the wearable cardiac device may be configured for monitoring the patient 104 without providing therapeutic shocks to the patient 104. In such implementations, the wearable cardiac device may include like components as those described above but does not include the therapy delivery circuit 900 and the therapeutic electrodes 304 (shown in dotted lines). That is, in some implementations, the wearable cardiac device can include the ECG monitoring components without the therapy components.

The therapy delivery circuit 900 can be coupled to the therapeutic electrodes 304 configured to provide therapy to the patient 104. For example, the therapy delivery circuit 900 can include, or be operably connected to, circuitry components that are configured to generate and provide an electrical therapeutic shock. The circuitry components can include, for example, resistors, capacitors, relays and/or switches, electrical bridges such as an H-bridge (e.g., including a plurality of insulated gate bipolar transistors or IGBTs), voltage and/or current measuring components, and other similar circuitry components arranged and connected such that the circuitry components work in concert with the therapy delivery circuit 900 and under the control of one or more processors (e.g., processor 916) to provide, for example, one or more pacing, defibrillation, or cardioversion therapeutic pulses. In implementations, pacing pulses can be used to treat cardiac arrhythmias such as bradycardia (e.g., less than 30 beats per minute) and tachycardia (e.g., more than 150 beats per minute) using, for example, fixed rate pacing, demand pacing, anti-tachycardia pacing, and the like. Defibrillation or cardioversion pulses can be used to treat ventricular tachycardia and/or ventricular fibrillation. In implementations, the therapy delivery circuit 900 is also configured to deliver the cardiac rhythm disruptive shocks (e.g., defibrillation-like shocks, pacing pulses, etc.) discussed above.

In implementations, the therapy delivery circuit 900 includes a first high-voltage circuit connecting a first pair of the therapeutic electrodes 304 and a second high-voltage circuit connecting a second pair of the therapeutic electrodes 304 such that the first biphasic therapeutic pulse is delivered via the first high-voltage circuit and the second biphasic therapeutic pulse is delivered via the second high-voltage circuit. In implementations, the second high-voltage circuit is configured to be electrically isolated from the first high-voltage circuit. In implementations, the therapy delivery circuit 900 includes a capacitor configured to be selectively connected to the first high-voltage circuit and/or the second high-voltage circuit. As such, the first high-voltage circuit may be powered by the capacitor when the capacitor is selectively connected to the first high-voltage circuit, and the second high-voltage circuit may be powered by the capacitor when the capacitor is selectively connected to the second high-voltage circuit. In implementations, the therapy delivery circuit 900 includes a first capacitor electrically connected to the first high-voltage circuit and a second capacitor electrically connected to the second high-voltage circuit.

The capacitors can include a parallel-connected capacitor bank consisting of a plurality of capacitors (e.g., two, three, four, or more capacitors). In some examples, the capacitors can include a single film or electrolytic capacitor as a series connected device including a bank of the same capacitors. These capacitors can be switched into a series connection during discharge for a defibrillation pulse. For example, four capacitors of approximately 140 µF or larger, or four capacitors of approximately 650 µF can be used. The capacitors can have a 1600 VDC or higher rating for a single capacitor, or a surge rating between approximately 350 to 500 VDC for paralleled capacitors and can be charged in approximately 15 to 30 seconds from a battery pack.

For example, each defibrillation pulse can deliver between 60 to 180 J of energy. In some implementations, the defibrillating pulse can be a biphasic truncated exponential waveform, whereby the signal can switch between a positive and a negative portion (e.g., charge directions). This type of waveform can be effective at defibrillating patients at lower energy levels when compared to other types of defibrillation pulses (e.g., such as monophasic pulses). For example, an amplitude and a width of the two phases of the energy waveform can be automatically adjusted to deliver a precise energy amount (e.g., 150 J) regardless of the patient's body impedance. The therapy delivery circuit 900 can be configured to perform the switching and pulse delivery operations, e.g., under control of the processor 916. As the energy is delivered to the patient 104, the amount of energy being delivered can be tracked. For example, the amount of energy can be kept to a predetermined constant value even as the pulse waveform is dynamically controlled based on factors, such as the patient's body impedance, while the pulse is being delivered.

In certain examples, the therapy delivery circuit 900 can be configured to deliver a set of cardioversion pulses to correct, for example, an improperly beating heart. When compared to defibrillation as described above, cardioversion typically includes a less powerful shock that is delivered at a certain frequency to mimic a heart's normal rhythm.

The data storage 902 can include one or more of non-transitory computer-readable media, such as flash memory, solid state memory, magnetic memory, optical memory, cache memory, combinations thereof, and others. The data storage 902 can be configured to store executable instructions and data used for operation of the cardiac controller 901. In some implementations, the data storage 902 can include sequences of executable instructions that, when executed, are configured to cause the processor 916 to perform one or more functions. For example, the data storage 902 can be configured to store information such as ECG data as received from, for instance, the sensor interface 910.

In some examples, the network interface 904 can facilitate the communication of information between the cardiac controller 901 and one or more devices or entities over a communications network. For example, the network interface 904 can be configured to communicate with a remote server or other similar computing device. The network interface 904 can include communications circuitry for transmitting data in accordance with a Bluetooth® wireless standard for exchanging such data over short distances to an intermediary device(s) (e.g., a base station, "hotspot" device, smartphone, tablet, portable computing device, and/or other device in proximity with the wearable cardiac device). The intermediary device(s) may in turn communicate the data to the remote server over a broadband cellular network communications link. The communications link may implement broadband cellular technology (e.g., 2.5G, 2.75G, 3G, 4G, 5G cellular standards) and/or Long-Term Evolution (LTE) technology or GSM/EDGE and UMTS/HSPA technologies for high-speed wireless communication. In some implementations, the intermediary device(s) may communicate with the remote server over a Wi-Fi communications link based on the IEEE 802.11 standard. In some implementations, the network interface 904 may be configured to instead communicate directly with the remote server without the use of intermediary device(s). In such implementations, the network interface 904 may use any of the communications links and/or protocols provided above.

In some implementations, the user interface 906 may include one or more physical interface devices, such as input devices, output devices, and combination input/output devices, and a software stack configured to drive operation of the devices. These user interface elements may render visual, audio, and/or tactile content. Thus, the user interface 906 may receive inputs and/or provide outputs, thereby enabling a user to interact with the cardiac controller 901. In implementations, the user interface 906 may include at least one assemblable element, such as the response button unit 260 shown in FIG. 27.

The cardiac controller 901 can also include at least one battery 908 configured to provide power to one or more components integrated in the cardiac controller 901. The battery 908 can include a rechargeable multi-cell battery pack. In one example implementation, the battery 908 can include three or more cells (e.g., 2200 mA lithium ion cells) that provide electrical power to the other device components within the cardiac controller 901. For example, the battery 908 can provide its power output in a range of between 20 mA to 1000 mA (e.g., 40 mA) output and can support 24 hours, 48 hours, 72 hours, or more, of runtime between charges. In certain implementations, the battery capacity, runtime, and type (e.g., lithium ion, nickel-cadmium, or nickel-metal hydride) can be changed to best fit the specific application of the cardiac controller 901.

The sensor interface 910 can include physiological signal circuitry that is coupled to one or more externally worn sensors, such as one or more assemblable elements configured to monitor one or more physiological parameters of the patient and output one or more physiological signals. As shown, the sensors may be coupled to the cardiac controller 901 via a wired or wireless connection. The sensors can include one or more ECG sensing electrodes 302 (e.g., ECG electrodes) configured to output at least one ECG signal. In some implementations, the sensors can include conventional ECG sensing electrodes and/or digital sensing electrodes. The sensors can also include one or more non-ECG physiological sensors 920 such as one or more vibration sensors 926, tissue fluid monitors 928 (e.g., based on ultra-wide band RF devices), one or more motion sensors (e.g., accelerometers, gyroscopes, and/or magnetometers), a temperature sensor, a pressure sensor, a P-wave sensor (e.g., a sensor configured to monitor and isolate P-waves within an ECG waveform), an oxygen saturation sensor (e.g., implemented through photoplethysmography, such as through light sources and light sensors configured to transmit light into the patient's body and receive transmitted and/or reflected light containing information about the patient's oxygen saturation), and so on.

The one or more vibration sensors 926 can be configured to detect cardiac or pulmonary vibration information. For example, the vibration sensors 926 can detect a patient's heart valve vibration information. For example, the vibration sensors 926 can be configured to detect cardio-vibrational signal values including any one or all of S1, S2, S3, and S4. From these cardio-vibrational signal values or heart vibration values, certain heart vibration metrics may be calculated, including any one or more of electromechanical activation time (EMAT), average EMAT, percentage of EMAT (% EMAT), systolic dysfunction index (SDI), and left ventricular systolic time (LVST). The vibration sensors 926 can also be configured to detect heart wall motion, for instance, by placement of the sensor in the region of the apical beat. The vibration sensors 926 can include a vibrational sensor configured to detect vibrations from a patient's cardiac and pulmonary system and provide an output signal responsive to the detected vibrations of a targeted organ, for example, being able to detect vibrations generated in the trachea or lungs due to the flow of air during breathing. In certain implementations, additional physiological information can be determined from pulmonary-vibrational signals such as, for example, lung vibration characteristics based on sounds produced within the lungs (e.g., stridor, crackle, etc.). The vibration sensors 926 can also include a multi-channel accelerometer, for example, a three-channel accelerometer configured to sense movement in each of three orthogonal axes such that patient movement/body position can be detected and correlated to detected cardio-vibrations information. The vibration sensors 926 can transmit information descriptive of the cardio-vibrations information to the sensor interface 910 for subsequent analysis.

The tissue fluid monitors 928 can use RF based techniques to assess fluid levels and accumulation in a patient's body tissue. For example, the tissue fluid monitors 928 can be configured to measure fluid content in the lungs, typically for diagnosis and follow-up of pulmonary edema or lung congestion in heart failure patients. The tissue fluid monitors 928 can include one or more antennas configured to direct RF waves through a patient's tissue and measure output RF signals in response to the waves that have passed through the tissue. In certain implementations, the output RF signals include parameters indicative of a fluid level in the patient's tissue. The tissue fluid monitors 928 can transmit information descriptive of the tissue fluid levels to the sensor interface 910 for subsequent analysis.

The controller 901 can further include a motion detector interface operably coupled to one or more motion detectors configured to generate motion data, for example, indicative of physical activity performed by the patient 104. Examples of a motion detector may include a 1-axis channel accelerometer, 2-axis channel accelerometer, 3-axis channel accelerometer, multi-axis channel accelerometer, gyroscope, magnetometer, ballistocardiograph, and the like. As an illustration, the motion data may include accelerometer counts indicative of physical activity, accelerometer counts indicative of respiration rate, and posture information for the patient 104. For instance, in some implementations, the controller 901 can include an accelerometer interface 912 operably coupled to one or more accelerometers 922, as shown in FIG. 19. Alternatively, in some implementations, the accelerometer interface 912 may be incorporated into other components of the controller 901. As an example, the accelerometer interface 912 may be part of the sensor interface 910, and the one or more accelerometers 922 may be part of the non-ECG physiological sensors 920, such as part of one of the assemblable elements of the wearable garment.

The accelerometer interface 912 is configured to receive one or more outputs from the accelerometers. The accelerometer interface 912 can be further configured to condition the output signals by, for example, converting analog accelerometer signals to digital signals (if using an analog accelerometer), filtering the output signals, combining the output signals into a combined directional signal (e.g., combining each x-axis signal into a composite x-axis signal, combining each y-axis signal into a composite y-axis signal, and combining each z-axis signal into a composite z-axis signal). In some examples, the accelerometer interface 912 can be configured to filter the signals using a high-pass or band-pass filter to isolate the acceleration of the patient due to movement from the component of the acceleration due to gravity.

Additionally, the accelerometer interface 912 can configure the output for further processing. For example, the accelerometer interface 912 can be configured to arrange the output of an individual accelerometer 922 as a vector expressing the acceleration components of the x-axis, the y-axis, and the z-axis as received from each accelerometer. The accelerometer interface 912 can be operably coupled to the processor 916 and configured to transfer the output signals from the accelerometers 922 to the processor for further processing and analysis.

The one or more accelerometers 922 can be integrated into one or more components of the wearable cardiac device. In some implementations, one or more motion detectors 922 may be located in or near the ECG sensing electrodes 302. In some implementations, the one or more motion detectors 922 may be located elsewhere on the wearable cardiac device. For example, a motion detector 922 can be integrated into the controller 901. In some examples, a motion detector 922 can be integrated into one or more of a therapeutic electrode 304, an ECG sensing electrode 302, the signal processing unit 310, and/or into other components of the wearable cardiac device. In some examples, a motion detector 922 can be integrated into an adhesive ECG sensing and/or therapy electrode patch.

As described above, the sensor interface 910 and the accelerometer interface 912 can be coupled to any one or combination of assemblable elements, such as sensing electrodes/other sensors to receive patient data indicative of patient parameters. Once data from the sensors has been received by the sensor interface 910 and/or the accelerometer interface 912, the data can be directed by the processor 916 to an appropriate component within the cardiac controller 901. For example, ECG signals collected by the ECG sensing electrodes 302 may be transmitted to the sensor interface 910, and the sensor interface 910 can transmit the ECG signals to the processor 916, which, in turn, relays the data to the cardiac event detector 914. The sensor data can also be stored in the data storage 902 and/or transmitted to a remote server via the network interface 904. For instance, the processor 916 may transfer the ECG signals from the ECG sensing electrodes 302 and the motion data from the one or more accelerometers 922 to a remote server.

In implementations, the cardiac event detector 914 can be configured to monitor the patient's ECG signal for an occurrence of a cardiac event such as an arrhythmia or other similar cardiac event. The cardiac event detector can be configured to operate in concert with the processor 916 to execute one or more methods that process received ECG signals from, for example, the ECG sensing electrodes 302 and determine the likelihood that a patient is experiencing a cardiac event, such as a treatable arrhythmia. The cardiac event detector 914 can be implemented using hardware or a combination of hardware and software. For instance, in some examples, cardiac event detector 914 can be implemented as a software component that is stored within the data storage 902 and executed by the processor 916. In this example, the instructions included in the cardiac event detector 914 can cause the processor 916 to perform one or more methods for analyzing a received ECG signal to determine whether an adverse cardiac event is occurring, such as a treatable arrhythmia. In other examples, the cardiac event detector 914 can be an application-specific integrated circuit (ASIC) that is coupled to the processor 916 and configured to monitor ECG signals for adverse cardiac event occurrences. Thus, examples of the cardiac event detector 914 are not limited to a particular hardware or software implementation.

In response to the cardiac event detector 914 determining that the patient 104 is experiencing a treatable arrhythmia, the processor 916 is configured to deliver a cardioversion/ defibrillation shock to the patient 104 via the therapeutic electrodes 304. In some implementations, the alarm manager 924 can be configured to manage alarm profiles and notify one or more intended recipients of events, where an alarm profile includes a given event and the intended recipients who may have an interest in the given event. These intended recipients can include external entities, such as users (e.g., patients, physicians and other caregivers, a patient's loved one, monitoring personnel), as well as computer systems (e.g., monitoring systems or emergency response systems, which may be included in a remote server or may be implemented as one or more separate systems). For example, when the processor 916 determines using data from the ECG sensing electrodes 302 that the patient is experiencing a treatable arrhythmia, the alarm manager 924 may issue an alarm via the user interface 906 that the patient is about to experience a defibrillating shock. The alarm may include auditory, tactile, and/or other types of alerts. In some implementations, the alerts may increase in intensity over time, such as increasing in pitch, increasing in volume, increasing in frequency, switching from a tactile alert to an auditory alert, and so on. Additionally, in some implementations, the alerts may inform the patient that the patient can abort the delivery of the defibrillating shock by interacting with the user interface 906. For instance, the patient may be able to press a user response button or user response buttons on the user interface 906, after which the alarm manager 924 will cease issuing an alert and the cardiac controller 901 will no longer prepare to deliver the defibrillating shock.

In implementations, the cardiac event detector 914 is configured to detect when the patient 104 is experiencing a cardiac rhythm change (e.g., an episode of VF, an episode of VT, a premature ventricular contraction) in response to a cardiac rhythm disruptive shock (e.g., coordinated by the therapy delivery circuit 900) delivered during a baselining session, as discussed above. Depending on the type of cardiac rhythm change, the processor 916 is configured to deliver a cardioversion/defibrillation shock to the patient 104 via the therapeutic electrodes 304, as discussed above, to restore the patient's normal cardiac rhythm. For example, if the cardiac rhythm change is VF, the processor 916 is configured to deliver a cardioversion/defibrillation shock to the patient 104. The processor 916 is also configured to record, in the data storage 902, data related to the cardiac rhythm change and the cardiac rhythm disruptive shock, as further discussed above (e.g., the energy level of the cardiac rhythm disruptive shock that induced the cardiac rhythm change).

The alarm manager 924 can be implemented using hardware or a combination of hardware and software. For instance, in some examples, the alarm manager 924 can be implemented as a software component that is stored within the data storage 902 and executed by the processor 916. In this example, the instructions included in the alarm manager 924 can cause the processor 916 to configure alarm profiles and notify intended recipients using the alarm profiles. In other examples, the alarm manager 924 can be an application-specific integrated circuit (ASIC) that is coupled to the processor 916 and configured to manage alarm profiles and notify intended recipients using alarms specified within the alarm profiles. Thus, examples of the alarm manager 924 are not limited to a particular hardware or software implementation.

In some implementations, the processor 916 includes one or more processors (or one or more processor cores) that each are configured to perform a series of instructions that result in the manipulation of data and/or the control of the operation of the other components of the cardiac controller 901. In some implementations, when executing a specific process (e.g., cardiac monitoring), the processor 916 can be configured to make specific logic-based determinations based on input data received. The processor 916 may be further configured to provide one or more outputs that can be used to control or otherwise inform subsequent processing to be carried out by the processor 916 and/or other processors or circuitry with which the processor 916 is communicably coupled. Thus, the processor 916 reacts to a specific input stimulus in a specific way and generates a corresponding output based on that input stimulus. In some example cases, the processor 916 can proceed through a sequence of logical transitions in which various internal register states and/or other bit cell states internal or external to the processor 916 may be set to logic high or logic low.

As referred to herein, the processor 916 can be configured to execute a function where software is stored in a data store (e.g., the data storage 902) coupled to the processor 916, the software being configured to cause the processor 916 to proceed through a sequence of various logic decisions that result in the function being executed. The various components that are described herein as being executable by the processor 916 can be implemented in various forms of specialized hardware, software, or a combination thereof. For example, the processor 916 can be a digital signal processor (DSP) such as a 24-bit DSP processor. As another example, the processor 916 can be a multi-core processor, e.g., having two or more processing cores. As another example, the processor 916 can be an Advanced RISC Machine (ARM) processor, such as a 32-bit ARM processor. The processor 916 can execute an embedded operating system and further execute services provided by the operating system, where these services can be used for file system manipulation, display and audio generation, basic networking, firewalling, data encryption, communications, and/or the like.

As noted above, a wearable cardiac device can be designed to include a digital front-end where analog signals sensed by skin-contacting electrode surfaces of a set of digital sensing electrodes are converted to digital signals for processing. Typical ambulatory medical devices with analog front-end configurations use circuitry to accommodate a signal from a high source impedance from the sensing electrode (e.g., having an internal impedance range from approximately 100 Kiloohms to one or more Megaohms). This high source impedance signal is processed and transmitted to a monitoring device such as processor 916 of the controller 901 as described above for further processing. In certain implementations, the monitoring device, or another similar processor such as a microprocessor or another dedicated processor operably coupled to the sensing electrodes, can be configured to receive a common noise signal from each of the sensing electrodes, sum the common noise signals, invert the summed common noise signals and feed the inverted signal back into the patient as a driven ground using, for example, a driven right leg circuit to cancel out common mode signals.

The wearable cardiac device is configured for long-term and/or extended use or wear by, or attachment or connection to, a patient. For example, devices as described herein may be capable of being continuously used or continuously worn by, or attached or connected to a patient, without substantial interruption (e.g., up to 24 hours or beyond, such as for weeks, months, or even years). In some implementations, such devices may be removed for a period of time before use, wear, attachment, or connection to the patient is resumed. As an illustration, devices may be removed to change batteries, carry out technical service, update the device software or firmware, and/or to take a shower or engage in other activities, without departing from the scope of the examples described herein. Such substantially or nearly continuous use or wear as described herein may nonetheless be considered continuous use or wear. Additionally, the wearable cardiac device may be configured to transmit signals and data to a remote server continuously or substantially continuously.

Figure 20:
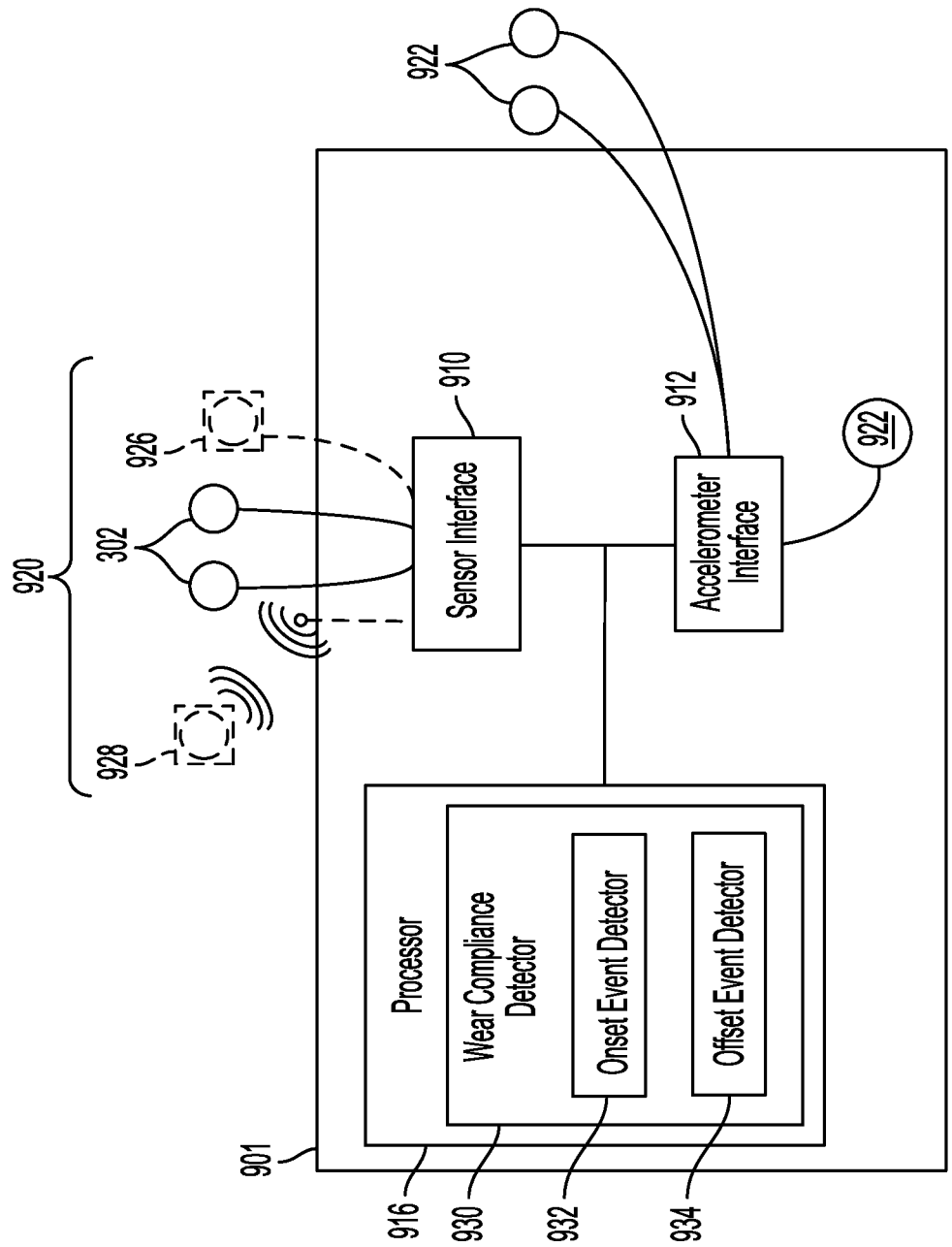
FIG. 20 depicts another example electronic architecture for a wearable defibrillator.

As described herein, and noted above, implementations of the present disclosure include monitoring medical device wear compliance for the patient 104. More specifically, the wear compliance information includes an accurate overview of what portion or percentage of a certain time period the patient has worn the wearable cardiac device and how this compares to the expected wear for the patient 104 as prescribed, for example, by their clinician or other healthcare provider when being prescribed the wearable cardiac device. FIG. 20 illustrates an example reduced component-level view of the cardiac controller 901 that includes the processor 916 that is configured to monitor wear compliance information for the patient 104 as described herein. For example, the processor 916 can include wear time circuitry, such as a wear compliance detector 930 as shown in FIG. 20. The wear compliance detector 930 may be integrated into the processor 916 as illustrated in FIG. 20, or the wear compliance detector 930 may be integrated as a separate processing component operably coupled to the processor 916. The wear compliance detector 930 can be implemented as a dedicated microprocessor and associated circuitry disposed on a printed circuit board (PCB) along with other components as described herein. The wear compliance detector 930, when implemented in a dedicated microprocessor or integrated into the processor 916, can be based on a series of processor-readable instructions configured to be executed by the dedicated microprocessor or processor 916. For example, the instructions can be implemented in a programming language such as C, C++, assembly language, machine code, HDL, or VEIDL. In examples, the dedicated microprocessor can be an Intel-based microprocessor such as an X86 microprocessor or a Motorola 68020 microprocessor, each of which can use a different set of binary codes and/or instructions for similar functions. In implementations, the dedicated microprocessor or processor 916 can be configured to implement wear onset event detection and wear offset event detection as set forth in FIG. 20.

As further shown in FIG. 20, the wear compliance detector 930 can include an onset event detector 932 and an offset event detector 934. As described above, the wear compliance detector 930 can be a dedicated microprocessor and associated circuitry disposed on a PCB along with other components as described herein. In implementations, a first microprocessor can be implemented as the onset event detector 932, and a second microprocessor can be implemented as the offset event detector 934. In some implementations, both the onset event detector 932 and offset event detector 934 can be implemented in the same microprocessor as described above. The onset event detector 932 and/or offset event detector 934, when implemented in a dedicated microprocessor or integrated into the processor 916, can be based on a series of processor-readable instructions configured to be executed by the dedicated microprocessor or processor 916.

As noted above, when a patient puts on the wearable cardiac device, a wear onset event can be determined based upon analysis of signals received from one or more of the sensors described herein. For example, based upon monitoring of signals output by the ECG sensing electrodes 302 as well as signals output by the accelerometers 922, the onset event detector 932 can determine an onset event indicative of the patient 104 putting on or otherwise wearing the wearable cardiac device. Similarly, the offset event detector 934 can determine an offset event indicative of the patient 104 turning off, removing, or otherwise stopping the wearable cardiac device from monitoring. Based upon the measured onset and offset events, the wear compliance detector 930 and/or the processor 916 can determine wear compliance information (e.g., wear time) for the patient 104.

Although the subject matter contained herein has been described in detail for the purpose of illustration, such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. Those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A wearable cardiac device for providing feedback during device assembly, the wearable cardiac device comprising:
    a garment configured to be continuously worn about a torso of a patient for an extended period of time, the garment comprising a plurality of assembly locations;
    a plurality of tags disposed on the garment at the plurality of assembly locations; and
    an electrode belt comprising a plurality of assemblable elements, each of the assemblable elements configured for assembly into the garment at a corresponding assembly location prior to use of the wearable cardiac device by the patient;
        wherein the plurality of assemblable elements comprises a plurality of electrodes configured to facilitate at least one of sensing electrical signals associated with cardiac activity of the patient or delivering one or more therapeutic pulses to the patient; and
        wherein at least one of the plurality of assemblable elements comprises respective local assembly feedback circuitry, each respective local assembly feedback circuitry comprising
            an assembly verification sensor configured to sense whether the respective assemblable element is assembled at the corresponding assembly location of the garment based on at least one of a presence or absence of a tag of the plurality of tags at the assembly location at which the respective assemblable element is assembled, and
            one or more local assembly feedback indicators locally disposed on the respective assemblable element and configured to provide a human-discernable feedback alert indicating whether the respective assemblable element is assembled at the corresponding assembly location of the garment.

2. The wearable cardiac device of claim 1, wherein the one or more local assembly feedback indicators comprise one or more visual indicators.

3. The wearable cardiac device of claim 2, wherein the one or more visual indicators comprise one or more LEDs configured to light up to provide the human-discernable feedback alert indicating whether the respective assemblable element is assembled at the corresponding assembly location of the garment.

4. The wearable cardiac device of claim 2, wherein the one or more visual indicators comprise one or more colored indicators configured to light up to provide the human-discernable feedback alert indicating whether the respective assemblable element is assembled at the corresponding assembly location of the garment.

5. The wearable cardiac device of claim 4, wherein the one or more visual indicators comprise a first colored indicator configured to light up when the respective assemblable element is assembled at the corresponding assembly location of the garment and a second colored indicator configured to light up when the respective assemblable element is not assembled at the corresponding assembly location of the garment.

6. The wearable cardiac device of claim 1, wherein the one or more local assembly feedback indicators comprise one or more auditory indicators.

7. The wearable cardiac device of claim 6, wherein the one or more auditory indicators comprise a speaker configured to emit a sound to provide the human-discernable feedback alert indicating whether the respective assemblable element is assembled at the corresponding assembly location of the garment.

8. The wearable cardiac device of claim 1, wherein the one or more local assembly feedback indicators comprise one or more tactile indicators.

9. The wearable cardiac device of claim 8, wherein the one or more tactile indicators comprise a buzzer configured to vibrate to provide the human-discernable feedback alert indicating whether the respective assemblable element is assembled at the corresponding assembly location of the garment.

10. The wearable cardiac device of claim 1, wherein the plurality of tags comprises a plurality of radio frequency identification (RFID) tags, and wherein the assembly verification sensor comprises an RFID reader configured to sense a corresponding RFID tag of the plurality of RFID tags disposed at the corresponding assembly location on the garment.

11. The wearable cardiac device of claim 1, wherein the plurality of tags comprises a plurality of near field communication (NFC) tags, and wherein the assembly verification sensor comprises an NFC reader configured to sense a corresponding NFC tag of the plurality of NFC tags disposed at the corresponding assembly location on the garment.

12. The wearable cardiac device of claim 1, wherein the plurality of tags comprises a plurality of color tags, and wherein the assembly verification sensor comprises a photoelectric sensor configured to sense a corresponding color tag of the plurality of color tags disposed at the corresponding assembly location on the garment.

13. The wearable cardiac device of claim 1, wherein the plurality of tags comprises a plurality of magnets, and wherein the assembly verification sensor comprises a Hall effect sensor configured to sense a corresponding magnet of the plurality of magnets disposed at the corresponding assembly location on the garment.

14. The wearable cardiac device of claim 1, wherein the plurality of electrodes comprises at least one therapeutic electrode configured to deliver the one or more therapeutic pulses to the patient.

15. The wearable cardiac device of claim 14, wherein the at least one of the plurality of assemblable elements comprising the respective local assembly feedback circuitry comprises the at least one therapeutic electrode.

16. The wearable cardiac device of claim 1, wherein the plurality of electrodes comprises at least one sensing electrode configured to sense the electrical signals associated with the cardiac activity of the patient.

17. The wearable cardiac device of claim 16, wherein the at least one of the plurality of assemblable elements comprising the respective local assembly feedback circuitry comprises the at least one sensing electrode.

18. The wearable cardiac device of claim 16, wherein the wearable cardiac device further comprises a controller configured to generate an ECG signal based on the electrical signals; and determine whether the patient is experiencing a treatable cardiac arrhythmia using the ECG signal.

19. The wearable cardiac device of claim 18, wherein the plurality of electrodes further comprise at least one therapeutic electrode configured to deliver the one or more therapeutic pulses to the patient, and wherein the controller is further configured to generate the one or more therapeutic pulses for delivery to the patient after determining that the patient is experiencing a treatable cardiac arrhythmia.

20. The wearable cardiac device of claim 18, wherein the plurality of assemblable elements further comprises a signal processing unit configured to electrically connect at least one of the plurality of electrodes to the controller.

21. The wearable cardiac device of claim 20, wherein the at least one of the plurality of assemblable elements comprising respective local assembly feedback circuitry comprises the signal processing unit.

* * * * *